United States Patent
Gakhal et al.

(10) Patent No.: US 9,678,678 B2
(45) Date of Patent: *Jun. 13, 2017

(54) STORAGE NETWORK DATA RETRIEVAL

(71) Applicant: Lyve Minds, Inc., Cupertino, VA (US)

(72) Inventors: Randeep Singh Gakhal, Cupertino, CA (US); Tapani Otala, Cupertino, CA (US); Stanley Ho, Cupertino, CA (US)

(73) Assignee: LYVE MINDS, INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,443

(22) Filed: May 9, 2014

(65) Prior Publication Data

US 2015/0177999 A1    Jun. 25, 2015

Related U.S. Application Data

(63) Continuation-in-part of application No. 14/137,654, filed on Dec. 20, 2013, now Pat. No. 8,880,838.

(51) Int. Cl.
*G06F 15/16* (2006.01)
*G06F 3/06* (2006.01)
(Continued)

(52) U.S. Cl.
CPC .......... *G06F 3/0619* (2013.01); *G06F 3/064* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS 5,881,311 A * 3/1999 Woods .................. G06F 3/0607
710/3
6,041,342 A 3/2000 Yamaguchi
(Continued)

FOREIGN PATENT DOCUMENTS

EP 0986225 A1 3/2000
JP 11508078 A 7/1999
(Continued)

OTHER PUBLICATIONS

International Search Report dated Sep. 14, 2015 as received in Application No. PCT/US2015/030006.
(Continued)

*Primary Examiner* — Dhairya A Patel
(74) *Attorney, Agent, or Firm* — Schwegman, Lundberg & Woessner, P.A.

(57) ABSTRACT

According to an aspect of an embodiment, a method of retrieving data in a storage network may include determining a list of storage blocks of a storage network for potential retrieval of a data file for storage on a first storage block of the storage network. The determining may be based on two or more of: assignment information of the data file as assigned by a storage network manager, location information, device types, peer-to-peer reachability, network information, and presence information. The method may also include attempting to retrieve the data file from a second storage block included in the list of storage blocks for storage on the first storage block. Further, the method may include attempting to retrieve the data file from a third storage block included in the list of storage blocks for storage on the first storage block when retrieval from the second storage block fails.

8 Claims, 10 Drawing Sheets

(51) Int. Cl.
*G06F 12/02* (2006.01)
*G06F 11/00* (2006.01)
*G06F 17/30* (2006.01)
*H04L 29/08* (2006.01)

(52) U.S. Cl.
CPC .......... *G06F 3/0608* (2013.01); *G06F 3/0613* (2013.01); *G06F 3/0655* (2013.01); *G06F 11/00* (2013.01); *G06F 12/023* (2013.01); *G06F 17/30174* (2013.01); *G06F 17/30194* (2013.01); *H04L 67/1097* (2013.01)

(56) References Cited

U.S. PATENT DOCUMENTS

| | | | |
|---|---|---|---|
| 6,085,192 A | 7/2000 | Mendez et al. | |
| 6,094,672 A | 7/2000 | Willie et al. | |
| 6,470,329 B1 | 10/2002 | Livschitz | |
| 6,629,174 B1 | 9/2003 | Farkas et al. | |
| 6,757,847 B1 | 6/2004 | Farkash et al. | |
| 6,789,258 B1 | 9/2004 | Zak | |
| 6,904,498 B2 | 6/2005 | Stolowitz | |
| 7,076,622 B2 | 7/2006 | Hsu et al. | |
| 7,600,125 B1* | 10/2009 | Stringham | G06F 11/1004 380/229 |
| 7,627,643 B1* | 12/2009 | Ignatoff | G06F 3/0611 709/212 |
| 7,882,315 B2 | 2/2011 | Tsai et al. | |
| 8,880,838 B2 | 11/2014 | Kaiser et al. | |
| 8,903,959 B2 | 12/2014 | Kaiser et al. | |
| 9,274,707 B2 | 3/2016 | Kaiser et al. | |
| 2001/0055950 A1* | 12/2001 | Davies | H04B 1/713 455/41.2 |
| 2002/0013832 A1* | 1/2002 | Hubbard | G06F 9/5044 709/220 |
| 2002/0078461 A1* | 6/2002 | Boykin | H04N 21/23106 725/87 |
| 2002/0120733 A1 | 8/2002 | Kring | |
| 2002/0129290 A1 | 9/2002 | Couillard | |
| 2002/0133508 A1 | 9/2002 | LaRue et al. | |
| 2002/0161911 A1 | 10/2002 | Thomas, III et al. | |
| 2003/0135541 A1 | 7/2003 | Maeda et al. | |
| 2003/0191827 A1 | 10/2003 | Piispanen et al. | |
| 2003/0229698 A1 | 12/2003 | Furuhashi et al. | |
| 2004/0127242 A1 | 7/2004 | Dashevsky et al. | |
| 2004/0139178 A1 | 7/2004 | Mendez et al. | |
| 2004/0199740 A1* | 10/2004 | Makela | G06F 12/023 711/170 |
| 2004/0225693 A1 | 11/2004 | Ganji et al. | |
| 2004/0230317 A1 | 11/2004 | Kumar et al. | |
| 2005/0038811 A1 | 2/2005 | Pivowar et al. | |
| 2005/0050142 A1 | 3/2005 | Capone et al. | |
| 2006/0015539 A1 | 1/2006 | Wolf et al. | |
| 2006/0085428 A1 | 4/2006 | Bozeman et al. | |
| 2006/0106881 A1 | 5/2006 | Leung et al. | |
| 2006/0224846 A1* | 10/2006 | Amarendran | G06F 3/0605 711/162 |
| 2006/0282485 A1* | 12/2006 | Aggarwal | G06F 17/30138 |
| 2006/0288053 A1 | 12/2006 | Holt et al. | |
| 2007/0050551 A1 | 3/2007 | Jung et al. | |
| 2007/0073793 A1 | 3/2007 | Blandy | |
| 2007/0174569 A1 | 7/2007 | Schnapp et al. | |
| 2007/0208748 A1 | 9/2007 | Li | |
| 2007/0275745 A1 | 11/2007 | Owen | |
| 2008/0077628 A1 | 3/2008 | Gonzalez et al. | |
| 2008/0077638 A1 | 3/2008 | Monk et al. | |
| 2008/0140932 A1 | 6/2008 | Flynn et al. | |
| 2008/0294769 A1 | 11/2008 | Doi et al. | |
| 2008/0307094 A1 | 12/2008 | Karonen et al. | |
| 2009/0228669 A1 | 9/2009 | Slesarev et al. | |
| 2009/0265473 A1 | 10/2009 | Hydrie et al. | |
| 2009/0271485 A1 | 10/2009 | Sawyer et al. | |
| 2010/0088271 A1* | 4/2010 | Brixius | G06F 17/30221 707/609 |
| 2010/0115078 A1 | 5/2010 | Ishikawa et al. | |
| 2010/0183034 A1 | 7/2010 | Kroepfl et al. | |
| 2010/0238775 A1* | 9/2010 | Ueno | G11B 27/002 369/47.15 |
| 2010/0241807 A1* | 9/2010 | Wu | G06F 17/30233 711/118 |
| 2010/0250492 A1* | 9/2010 | Dewey | G06F 17/30067 707/638 |
| 2010/0257219 A1* | 10/2010 | Patel | G06F 11/1076 707/827 |
| 2010/0274762 A1 | 10/2010 | Murphy | |
| 2010/0299444 A1 | 11/2010 | Nilo et al. | |
| 2010/0332450 A1 | 12/2010 | Mills et al. | |
| 2011/0113234 A1* | 5/2011 | Augenstein | G06F 3/0605 713/150 |
| 2011/0238775 A1* | 9/2011 | Wu | G06F 17/30233 709/213 |
| 2011/0265143 A1* | 10/2011 | Grube | G06F 11/0727 726/2 |
| 2011/0289366 A1 | 11/2011 | Baptist et al. | |
| 2012/0173900 A1 | 7/2012 | Diab et al. | |
| 2012/0221647 A1* | 8/2012 | Ciminiera | H04L 67/104 709/204 |
| 2012/0290811 A1 | 11/2012 | Cilibrasi | |
| 2013/0185229 A1* | 7/2013 | Naga | G06F 12/123 705/418 |
| 2013/0232215 A1* | 9/2013 | Gupta | G06F 3/061 709/213 |
| 2013/0332505 A1 | 12/2013 | Karandikar | |
| 2013/0340000 A1 | 12/2013 | Chen et al. | |
| 2014/0108474 A1* | 4/2014 | David | G06F 17/30 707/827 |
| 2014/0189264 A1* | 7/2014 | George | G06F 3/0611 711/154 |
| 2014/0195482 A1 | 7/2014 | Kaiser et al. | |
| 2014/0195640 A1 | 7/2014 | Kaiser et al. | |
| 2014/0195757 A1 | 7/2014 | Kaiser et al. | |
| 2014/0195769 A1 | 7/2014 | Kaiser et al. | |
| 2015/0005859 A1 | 1/2015 | Thacker | |
| 2015/0058591 A1 | 2/2015 | Kaiser et al. | |
| 2016/0132267 A1 | 5/2016 | Kaiser et al. | |

FOREIGN PATENT DOCUMENTS

| | | |
|---|---|---|
| JP | 2004013547 A | 1/2004 |
| JP | 2011513805 A | 4/2011 |
| JP | 2012524947 A | 10/2012 |
| KR | 1020080065490 A | 7/2008 |
| KR | 100994139 B1 | 11/2010 |
| KR | 20120004463 A | 1/2012 |
| TW | 200410216 A | 6/2004 |
| TW | 200723093 A | 6/2007 |
| TW | 200725594 A | 7/2007 |
| TW | M441275 U | 11/2012 |
| WO | WO-0023897 A1 | 4/2000 |
| WO | WO-0161495 A1 | 8/2001 |
| WO | WO-2014110142 A1 | 7/2014 |
| WO | WO-2015095851 A1 | 6/2015 |
| WO | WO-2015095852 A1 | 6/2015 |
| WO | WO-2015172093 A1 | 11/2015 |

OTHER PUBLICATIONS

Written Opinion of the International Searching Authority dated Sep. 14, 2015 as received in Application No. PCT/US2015/030006.
Taiwan Office Action dated Mar. 16, 2016 as received in Application No. 104114307 (English Translation).
"U.S. Appl. No. 14/137,680, Response filed Oct. 11, 2016 to Non Final Office Action mailed May 11, 2016", 16 pgs.
"European Application Serial No. 14737590.1, Extended European Search Report mailed Sep. 22, 2016", 8 pgs.
"Korean Application Serial No. 10-2015-7021377, Office Action mailed May 4, 2016", w/ English Translation, 11 pgs.
"Taiwanese Application Serial No. 103100524, Office Action mailed Mar. 20, 15", w/ English Translation, 23 pgs.
"Taiwanese Application Serial No. 103144547, Office Action mailed Feb. 1, 2016", w/ English Translation, 11 pgs.

(56) References Cited

OTHER PUBLICATIONS

"Taiwanese Application Serial No. 103144547, Office Action mailed Sep. 14, 2016", w/ English Translation, 10 pgs.
"Taiwanese Application Serial 103144548, Office Action mailed Feb. 1, 2016", w/ English Translation, 20 pgs.
"Taiwanese Application Serial No. 103144548, Response filed Apr. 29, 2016 to Office Action mailed Feb. 1, 2016", w/ English pending claims, 20 pgs.
"U.S. Appl. No. 14/137,680, Notice of Allowance mailed Nov. 16, 2016", 5 pgs.
"U.S. Appl. No. 14/137,691, Final Office Action mailed Dec. 12, 2016", 21 pgs.
"U.S. Appl. No. 14/137,691, Response filed Nov. 16, 2016 to Non Final Office Action Jun. 16, 2016", 12 pgs.
"U.S. Appl. No. 14/531,791, Response filed Nov. 30, 2016 to Non Final Office Action mailed Jun. 30, 2016", 10 pgs.
"U.S. Appl. No. 14/996,132, Final Office Action mailed Nov. 17, 2016", 18 pgs.
"Canadian Application Serial No. 2900966, Office Action mailed Sep. 23, 2016", 5 pgs.
"Japanese Application U.S. Appl. No. 2015552745, Office Action mailed Oct. 25, 2016", with English translation of claims, 22 pgs.
"Korean Application Serial No. 10-2015-7021377, Notice of Allowance mailed Oct. 21, 2016", W/ English Claims, 8 pgs.
"Korean Application Serial No. 10-2016-7009335, Non-Final Office Action mailed Dec. 21, 2016", w/ English Translation, 13 pgs.
"Korean Application Serial No. 10-2016-7019712, Office Action mailed Jan. 19, 2017", with English translation of claims, 12 pgs.
"Taiwanese Application Serial No. 103144548, Office Action mailed Nov. 1, 2016", w/ English Translation and Claims, 15 pgs.
"U.S. Appl. No. 14/137,654, Non Final Office Action mailed Mar. 26, 2014", 13 pgs.
"U.S. Appl. No. 14/137,654, Notice of Allowance mailed Aug. 8, 2014", 11 pgs.
"U.S. Appl. No. 14/137,654, Notice of Allowance mailed Sep. 2, 2014", 5 pgs.
"U.S. Appl. No. 14/137,654, Preliminary Amendment filed Jan. 17, 2014", 4 pgs.
"U.S. Appl. No. 14/137,654, Response filed Jun. 26, 2014 to Non Final Office Action mailed Mar. 26, 2014", 15 pgs.
"U.S. Appl. No. 14/137,664, Examiner Interview Summary mailed May 28, 2014", 3 pgs.
"Application U.S. Appl. No. 14/137,664, Non Final Office Action nailed 03-13-14", 16 pgs.
"U.S. Appl. No. 14/137,664, Notice of Allowance mailed Jul. 3, 2014", 9 pgs.
"U.S. Appl. No. 14/137,664, Notice of Allowance mailed Oct. 14, 2014", 5 pgs.
"U.S. Appl. No. 14/137,664, Preliminary Amendment filed Jan. 17, 2014", 3 pgs.
"U.S. Appl. No. 14/137,664, Response filed Jun. 9, 2014 to Non Final Office Action mailed Mar. 13, 2014", 16 pgs.
"U.S. Appl. No. 14/137,680, Advisory Action mailed Mar. 17, 2016", 3 pgs.
"U.S. Appl. No. 14/137,680, Examiner Interview Summary mailed Feb. 9, 2016", 3 pgs.
"U.S. Appl. No. 14/137,680, Final Office Action mailed Dec. 1, 2015", 14 pgs.
"U.S. Appl. No. 14/137,680, Non Final Office Action mailed May 11, 2016", 15 pgs.
"U.S. Appl. No. 14/137,680, Non Final Office Action mailed Sep. 3, 2015", 14 pgs.
"U.S. Appl. No. 14/137,680, Response filed Feb. 18, 2016 to Final Office Action mailed Dec. 1, 2015", 9 pgs.
"U.S. Appl. No. 14/137,680, Response filed Apr. 1, 2016 to Advisory Action mailed Mar. 17, 2016", 9 pgs.
"U.S. Appl. No. 14/137,680, Response filed Oct. 14, 2015 to Non Final Office Action mailed Sep. 3, 2015", 11 pgs.
"U.S. Appl. No. 14/137,691, Final Office Action mailed Feb. 22, 2016", 17 pgs.
"U.S. Appl. No. 14/137,691, Non Final Office Action mailed Jun. 16, 2016", 22 pgs.
"U.S. Appl. No. 14/137,691, Non Final Office Action mailed Nov. 9, 2015", 15 pgs.
"U.S. Appl. No. 14/137,691, Response filed Jan. 19, 2016 to Non Final Office Action mailed Nov. 9, 2015", 12 pgs.
"U.S. Appl. No. 14/137,691, Response filed May 23, 2016 to Final Office Action mailed Feb. 22, 2016", 12 pgs.
"U.S. Appl. No. 14/531,786, Final Office Action mailed Jul. 8, 2015", 8 pgs.
"U.S. Appl. No. 14/531,786, Non Final Office Action mailed Dec. 5, 2014", 15 pgs.
"U.S. Appl. No. 14/531,786, Notice of Allowancemailed Oct. 23, 2015", 5 pgs.
"U.S. Appl. No. 14/531,786, Response filed Apr. 6, 2015 to Non Final Office Action mailed Dec. 5, 2014", 12 pgs.
"U.S. Appl. No. 14/531,786, Response filed Oct. 6, 2015 to Final Office Action mailed Jul. 8, 2015", 7 pgs.
"U.S. Appl. No. 14/531,791, Advisory Action mailed May 16, 2016", 4 pgs.
"U.S. Appl. No. 14/531,791, Examiner' Interview Summary mailed Feb. 22, 2016", 3 pgs.
"U.S. Appl. No. 14/531,791, Examiner Interview Summary mailed Sep. 2, 2015", 3 pgs.
"U.S. Appl. No. 14/531,791, Final Office Action mailed Jan. 21, 2016", 8 pgs.
"U.S. Appl. No. 14/531,791, Non Final Office Action mailed Jun. 30, 2016", 10 pgs.
"U.S. Appl. No. 14/531,791, Non Final Office Action rrrailed Jul. 7-, 2015", 11 pgs.
"U.S. Appl. No. 14/531,791, Response filed Apr. 12, 2016 to Final Office Action mailed Jan. 21, 2016", 10 pgs.
"U.S. Appl. No. 14/531,791, Response filed May 23, 2016 to Advisory Action mailed May 16, 2016", 10 pgs.
"U.S. Appl. No. 14/531,791, Response filed Sep. 29, 2015 to Non Final Office Action Jul. 7, 2015", 10 pgs.
"U.S. Appl. No. 14/996,132, Non Final Office Action mailed May 19, 2016", 19 pgs.
"U.S. Appl. No. 14/996,132, Response filed Aug. 19, 2016 to Non Final Office Action mailed May 19, 2016", 10 pgs.
"International Application Serial No. PCT/US20 4/010694, International Preliminary Report on Patentability mailed Jul. 23, 2015", 6 pgs.
"International Application Serial No. PCT/US2014/010694, International Search Report mailed Apr. 30, 2014", 3 pgs.
"International Application Serial No. PCT/US2014/010694, Written Opinion mailed Apr. 30, 2014", 4 pgs.
"International Application Serial No. PCT/US2014/010697, International Preliminary Report on Patentability mailed Jul. 23, 2015", 7 pgs.
"International Application Serial No. PCT/US2014/010697, International Search Report mailed Apr. 30, 2014", 3 pgs.
"International Application Serial No. PCT/US2014/010697, Written Opinion mailed Apr. 30, 2014", 5 pgs.
"International Application Serial No. PCT/US2014/071761, International Preliminary Report on Patentability mailed Jun. 30, 2016", 8 pgs.
"International Application Serial No. PCT/US2014/071761, International Search Report mailed Mar. 20, 2015", 3 pgs.
"International Application Serial No. PCT/US2014/071761, Written Opinion mailed Mar. 20, 2015", 6 pgs.
"International Application Serial No. PCT/US2014/071762, International Preliminary Report mailed Jun. 30, 2016", 8 pgs.
"International Application Serial No. PCT/US2014/071762, International Search Report mailed Mar. 30, 2015", 3 pgs.
"International Application Serial No. PCT/US2014/071762, Written Opinion mailed Mar. 30, 2015", 6 pgs.
U.S. Appl. No. 14/531,791, filed Nov. 3, 2014, Storage Network Data Distribution.
U.S. Appl. No. 14/137,680, filed Dec. 20, 2013, Management of Storage in a Storage Network.

(56) References Cited

OTHER PUBLICATIONS

U.S. Appl. No. 14/996,132, filed Jan. 14, 2016, Storage Network Data Allocation.
U.S. Appl. No. 14/137,691, filed Dec. 20, 2013, Data Synchronization in a Storage Network.

* cited by examiner

STORAGE NETWORK DATA RETRIEVAL

CROSS-REFERENCE TO RELATED APPLICATIONS

This application is a continuation-in-part of U.S. patent application Ser. No. 14/137,654, filed on Dec. 20, 2013, entitled "STORAGE NETWORK DATA ALLOCATION". The foregoing application is incorporated herein by reference in its entirety.

FIELD

The embodiments discussed herein are related to data transfer in a storage network.

BACKGROUND

The amount of personal data (e.g., photos, video, documents, etc.) is increasing such that different methods and systems for storing personal data are also increasing. Additionally, personal data may be stored and accessed using any number of devices having different types. However, many methods and systems of storing and accessing personal data may present challenges such as being cumbersome and time consuming, providing inadequate redundancy, and not allowing for easy accessibility of the data on different devices, among other things.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of retrieving data in a storage network may include determining a list of storage blocks of a storage network for potential retrieval of a data file for storage on a first storage block of the storage network. The determining may be based on two or more of: assignment information of the data file as assigned by a storage network manager of the storage network, location information indicating which storage blocks of the storage network include the data file stored thereon, physical location information of the storage blocks, device types of devices that include storage blocks with the data file stored thereon, peer-to-peer reachability, network information indicating which storage blocks are connected to the same local network, and presence information indicating the presence, with respect to the storage network, of the storage blocks including the data file stored thereon. The method may also include attempting to retrieve the data file from a second storage block included in the list of storage blocks for storage on the first storage block. Further, the method may include attempting to retrieve the data file from a third storage block included in the list of storage blocks for storage on the first storage block when retrieval from the second storage block fails.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

As described in further detail below, a storage system may be configured to allocate data among storage blocks included in a storage network, which may be managed by storage agents of the storage network. The storage system may be configured to allocate the data based on the devices associated with the storage agents and specifically based on types of the devices and device characteristics related to the types of the devices. In some embodiments, the allocation may also be based on characteristics of the data that is to be allocated. The allocation of data as described below may help to improve distribution of data among storage blocks. Improving the distribution of the data may help to increase ease of access and redundancy of the data. Alternately or additionally, in some embodiments, the storage system may be configured to determine a distribution strategy for distributing the data to the storage blocks based on one or more device characteristics of the devices included in the storage network. Embodiments of the present disclosure will be explained with reference to the accompanying drawings.

Figure 1A:
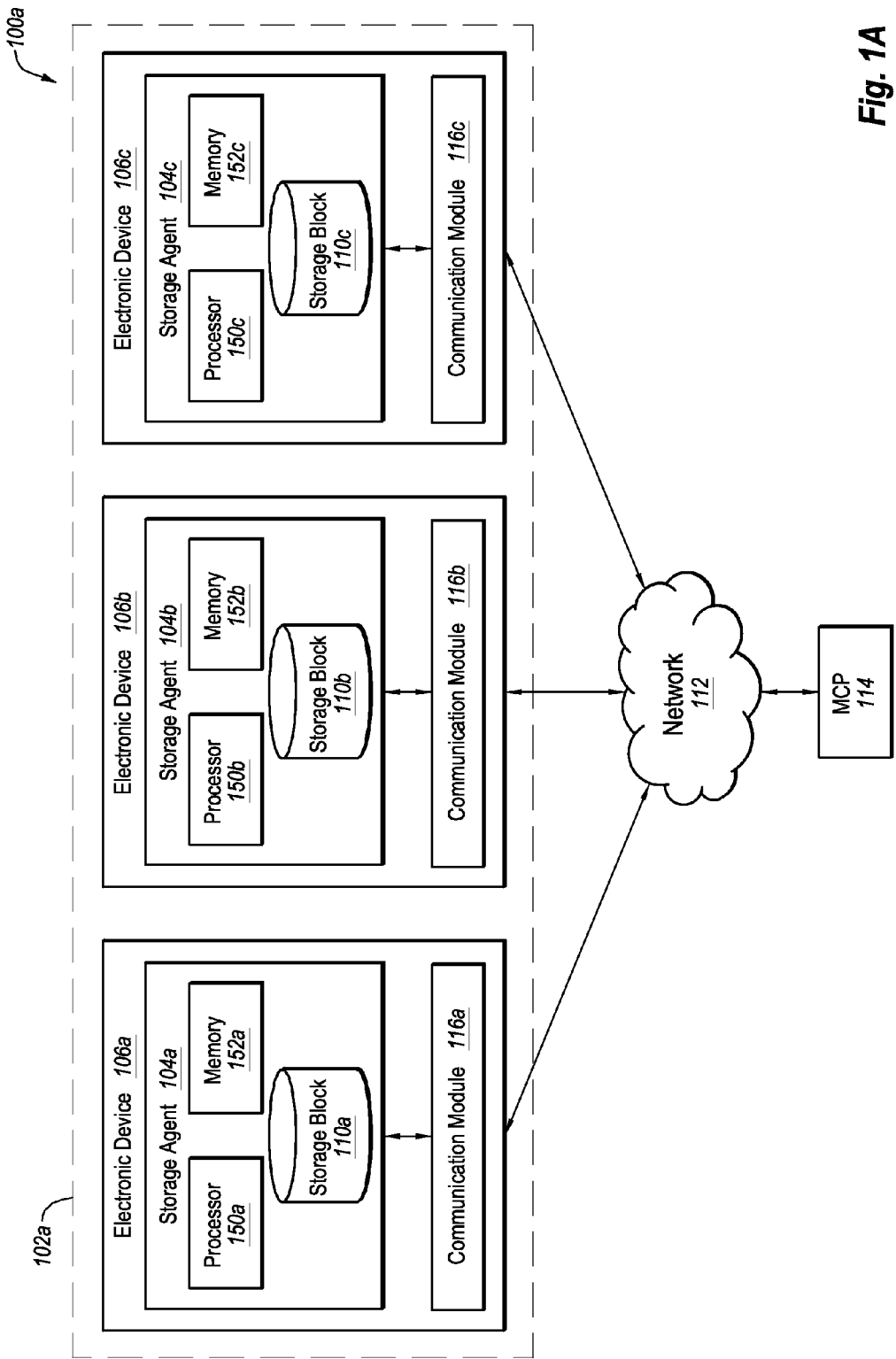
FIG. 1A illustrates an example storage system configured to allocate data to storage blocks included in a storage network.

FIG. 1A illustrates a block diagram of an example storage system 100a configured to allocate data to storage blocks 110 included in a storage network 102a, according to at least one embodiment of the present disclosure. The storage network 102a may include storage blocks 110a-110c, which may be included in electronic devices 106a-106c (also referred to herein as "devices" 106), respectively. The management of storage of the data on the storage blocks 110 may be performed by one or more storage agents 104. In the illustrated embodiment, the storage system 100a is depicted as including the storage agents 104a-104c, where the devices 106a-106c, respectively, include the storage agents 104a-104c. Although the storage system 100a is illustrated as including a single storage network 102a with three different storage blocks 110, the storage agents 104 and the devices 106 associated therewith, the storage system 100a may include any number of storage networks that may each include any number of the storage blocks 110, the storage agents 104, and the devices 106. Additionally, one or more of the devices 106 may include more than one storage agent 104 and/or the storage block 110, in some embodiments.

In some embodiments, the storage system 100a may be configured to store, organize, and/or manage data files such as photos, videos, documents, etc. In some embodiments, the data files may be included in data objects that may also include metadata that may provide information about the data files. The term "data" in the present disclosure may refer to any suitable information that may be stored by the storage blocks 110 and may include one or more data files, metadata, or any combination thereof.

The storage system 100a may be configured to organize and manage the data stored across the storage blocks 110a-110c in an automated fashion that may reduce an amount of input required by a user. Additionally, the storage system 100a may be configured such that data stored on a particular storage block 110 may be accessed and used by the devices 106 that do not include the particular storage block 110. As such, the storage system 100a may facilitate organization of the data stored by the storage blocks 110 and managed by the storage agents 104 within the storage network 102a as well as provide access to the data, regardless of whether the data is stored on the storage block 110 local to a particular device 106.

The devices 106 may be any electronic device that may include one or more storage blocks 110. The devices 106 may be configured to store data to or access data from their associated storage blocks 110. By way of example, the devices 106 may be any one of a cloud storage server, a mobile phone, a tablet computer, a desktop computer, a laptop computer, a camera, a personal digital assistant (PDA), a smartphone, a music player, a video player, an external hard drive, etc.

In some embodiments, the devices 106 may also include a controller 120, which may each include a processor 150, memory 152, and the storage block 110. Additionally, the controllers 120 may each include one or more storage agents 104 that may be configured to manage the storage of data on the storage blocks 110 and the interaction of the devices 106 and the storage blocks 110 with the storage network 102. By way of example, in the illustrated embodiment, the device 106a may include a controller 120a that includes a storage agent 104a, a processor 150a, memory 152a, and a storage block 110a; the device 106b may include a controller 120b that includes a storage agent 104b, a processor 150b, memory 152b, and a storage block 110b; and the device 106c may include a controller 120c that includes a storage agent 104c, a processor 150c, memory 152c, and a storage block 110c.

The processors 150 may include, for example, a microprocessor, microcontroller, digital signal processor (DSP), application-specific integrated circuit (ASIC), a Field-Programmable Gate Array (FPGA), or any other digital or analog circuitry configured to interpret and/or to execute program instructions and/or to process data. In some embodiments, the processors 150 may interpret and/or execute program instructions and/or process data stored in their associated memory 152 and/or one or more of the storage blocks 110.

The memories 152 may include any suitable computer-readable media configured to retain program instructions and/or data for a period of time. By way of example, and not limitation, such computer-readable media may include tangible and/or non-transitory computer-readable storage media, including Random Access Memory (RAM), Read-Only Memory (ROM), Electrically Erasable Programmable Read-Only Memory (EEPROM), Compact Disk Read-Only Memory (CD-ROM) or other optical disk storage, magnetic disk storage or other magnetic storage devices, flash memory devices (e.g., solid state memory devices), a specific molecular sequence (e.g., DNA or RNA), or any other storage medium which may be used to carry or store desired program code in the form of computer-executable instructions or data structures and which may be accessed by the processors 150. Combinations of the above may also be included within the scope of computer-readable media. Computer-executable instructions may include, for example, instructions and data that cause a general-purpose computer, special-purpose computer, or special-purpose processing device (e.g., the processors 150) to perform a certain function or group of functions. In some embodiments, the storage agents 104 may be stored as computer-executable instructions inside of the memory 152 of their respective device 106.

The storage blocks 110 may also be any suitable computer-readable medium configured to store data. The storage blocks 110 may store data that may be substantially the same across different storage blocks 110 and may also store data that may only be found on the particular storage block 110. Although each device 106 is depicted as including a single storage block 110, the devices 106 may include any number of storage blocks 110 of any suitable type of computer-readable medium. For example, the device 106 may include a first storage block 110 that is a hard disk drive and a second storage block 110 that is a flash disk drive. Further, the storage block 110 may include more than one type of computer-readable medium. For example, the storage block 110 may include a hard disk drive and a flash drive. Additionally, the storage block 110 may be removable from the device 106 such that it may be included with more than one device 106 at different times. For example, the storage block 110 may be a Universal Serial Bus (USB) storage device or a Secure Digital (SD) card that may be connected to different devices 106 at different times.

As mentioned above, the storage agents 104 may be configured to manage the storage of data on the storage blocks 110 with respect to the storage network 102a. In some embodiments and as indicated above, one or more of the storage agents 104 may be included with any suitable device 106. Additionally, in some embodiments, the device 106 may not include the storage agent 104. In these and other embodiments, one or more storage agents 104 included on one or more other devices 106 may be configured to manage the data on the storage block 110 of the device 106 that may not include a storage agent. For example, in some embodiments, the particular storage block 110 may be included in the particular device 106 that is a cloud server managed by a third party. In some of these instances, one or more storage agents 104 of other devices 106 may be configured to manage the storage of data on the particular storage block 110 that is part of the particular device 106.

Additionally, the particular storage block 110 may be a portable storage element such as a USB memory stick that may be coupled with different devices 106 at different times such that different storage agents 104 may manage the particular storage block 110 at different times. For example, in some instances the particular storage block 110 may be coupled to the device 106a at one point in time such that the storage agent 104a may manage the particular storage block 110. Further, at a different time, the particular storage block 110 may be coupled to the device 106b such that the storage agent 104b may manage the particular storage block 110.

The devices 106 may each include a communication module 116 that may provide connectivity between the devices 106 to allow for communication of data between the storage blocks 110 and the storage agents 104. For example, the device 106a may include a communication module 116a, the device 106b may include a communication module 116b, and the device 106c may include a communication module 116c.

The communication modules 116 may provide any suitable form of communication capability between the devices 106. By way of example and not limitation, the communication modules 116 may be configured to provide, via wired and/or wireless mechanisms, Internet connectivity, Local Area Network (LAN) connectivity, Wide Area Network (WAN) connectivity, Bluetooth connectivity, 3G connectivity, 4G connectivity, LTE connectivity, Wireless Fidelity (Wi-Fi) connectivity, Machine-to-Machine (M2M) connectivity, Device-to-Device (D2D) connectivity, any other suitable communication capability, or any suitable combination thereof.

In the illustrated embodiment, the communication modules 116 are depicted as providing connectivity between the devices 106 via a communication network 112 (referred to hereinafter as "network 112"). In some embodiments, the network 112 may include, either alone or in any suitable combination, the Internet, an Intranet, a local Wi-Fi network, a wireless LAN, a mobile network (e.g., a 3G, 4G, and/or LTE network), a LAN, a WAN, or any other suitable communication network. Although not expressly depicted in FIG. 1, in these and other embodiments, the communication modules 116 may provide direct connectivity between the devices 106.

The communication of data stored on the storage blocks 110 between the devices 106 may accordingly allow for the devices 106 to access and use data that may not be stored locally on their associated storage blocks 110. The storage agents 104 may be configured to facilitate such coordination and communication of data between the devices 106. As such, the storage network 102a, the devices 106, the storage agents 104, and the storage blocks 110 may allow for storage of data while also allowing the devices 106 access to the stored data even when the data is not locally stored on the storage blocks 110 included in the particular devices 106. Additionally, the communication of data between the devices 106 and associated coordination by the storage agents 104 may facilitate providing redundancy of the data such that storage blocks may be added to and removed from the storage network 102a with little to no loss of the data in the storage network 102a.

In some embodiments, the devices 106 may act similar to clients or servers included in an object-based file system. For instance, some devices 106 may be configured to store only metadata associated with various data objects, while other devices 106 may be configured to store metadata and actual data files associated with the various data objects.

In some embodiments, to manage and provide information related to the storage of data in the storage network 102a, a catalog of data may be generated and managed for the storage network 102a. For example, in some embodiments, the catalog may include information such as which storage blocks 110 may be locally storing data objects, individual data files, and/or metadata. In some embodiments, the catalog may include a collection of all the metadata of the data objects stored in the storage network 102a. Accordingly, the catalog may be used to determine which storage block 110 has certain data stored thereon. As such, the devices 106 may know from where to access data if the data is not stored locally on their respective storage blocks 110. In some embodiments, the catalog may be stored by and synchronized between each of the storage blocks 110 based on synchronizations that may be managed by the storage agents 104.

In some embodiments, the storage agents 104 may be configured to communicate with one or more storage network controllers that may be referred to individually or collectively as a storage network manager 114. The storage network manager 114 may act similar to a central service in a distributed storage system. The storage network manager 114 may be associated with a server operated by a third-party providing storage management services or may be locally stored on the device 106 owned and/or managed by a user whose data is stored in the storage network 102a.

The storage network manager 114 may perform multiple functions in the storage system 100a, such as coordinating actions of the storage agents 104. For example, the functions of the storage network manager 114 may include, but are not limited to, locating data files among the storage blocks 110 of the storage network 102a, coordinating synchronization of data between the storage blocks 110 as performed by the storage agents 104, allocating storage of data on the storage blocks 110, and coordinating distribution of the data to the storage blocks 110. The allocation and distribution of data between the storage blocks 110 is described in further detail below.

In some embodiments, the storage network manager 114 may be included in the device 106 that is local to a user of the storage network 102a and, in other embodiments, the storage network manager 114 may be included in the device 106 that is managed by a third party. In some embodiments, the storage network manager 114 may perform operations such that the storage network manager 114 may act as and be a storage agent. For example, the storage network manager 114 may manage data such as the catalog and/or other metadata associated with the storage network 102a and may synchronize this data with other storage agents 104 such that the storage network manager 114 may act as a storage agent with respect to such data.

In some embodiments the storage network manager 114 may communicate with the storage agents 104 via the network 112 (as illustrated in FIG. 1A). The storage network manager 114 may also be configured to communicate with one or more of the storage agents 104 via a direct communication (not expressly illustrated in FIG. 1).

Metadata associated with the data included in the storage network 102a (e.g., the catalog described above) may include information regarding the status of the data, which may assist in locating data files, coordinating synchronization of data, allocating the data among the storage blocks 110, and determining a distribution strategy for allocated data, among other things. The status may indicate which data files may be allocated to which storage blocks 110, the distribution strategy associated with the different data files, when a transfer of data between the storage blocks 110 has started, that a transfer of data between the storage blocks 110 is ongoing, that a transfer of data between the storage blocks 110 stopped before the data was completely transferred, and whether particular data is still stored on the storage block 110.

In some embodiments, the storage network manager 114 may communicate instructions to the storage agents 104 regarding storage of the data such as the allocation and distribution of the data with respect to the storage blocks 110. The storage agents 104 may act in response to the instructions communicated from the storage network manager 114 such that the data may be stored on the storage blocks 110 according to the allocation and distribution. Additionally, in some embodiments, metadata communicated to and used by the storage network manager 114 may be such that the storage network manager 114 may know information about the associated data files (e.g., size, type, unique identifiers, location, etc.) stored in the storage network 102*a*, but may not know information about the actual content of the data files stored in the storage network 102*a*.

The storage agents 104 may locate data files within the storage network 102*a* according to metadata that may be stored on each of the storage agents 104. In some embodiments, such metadata may be stored as the catalog described above. For example, the storage agent 104*a* may locate a data file stored on the storage block 110*b* using the catalog stored on the storage block 110*a* and managed by the storage agent 104*a*. Some or all of the information for the storage agents 104 to locate data files stored on the storage network 102*a* may be communicated during synchronization of metadata performed by the storage agents 104 and/or a particular storage agent 104 and the storage network manager 114. Additionally or alternatively, the storage agents 104 may communicate with the storage network manager 114 to locate data files stored on the storage network 102*a*.

Additionally, the storage network manager 114 may communicate with one or more of the storage agents 104 with unreliable, non-existent, or intermittent connectivity with the other storage agents 104. As such, the storage network manager 114 may be configured to relay information received from one storage agent 104 to another storage agent 104 to maintain the communication of data between the storage agents 104. For example, the storage agent 104*c* may be communicatively coupled to the storage agent 104*b* and/or the storage agent 104*a* using an unreliable or intermittent connection. The storage network manager 114 may accordingly communicate with the storage agent 104*c* via the communication network 112, and may then relay information from the storage agent 104*c* to the storage agent 104*b* and/or the storage agent 104*a*.

The storage network manager 114 may also be configured to determine a presence of the devices 106 and/or the storage blocks 110 within the storage network 102*a*. The presence of the devices 106 or the storage blocks 110 may indicate which of the devices 106 are communicatively coupled with another device 106 of the storage network 102*a* and/or with the storage network manager 114, thus indicating which of the devices 106 and the associated storage blocks 110 are "present" within or connected to the storage network 102*a*. The presence of the devices 106 and their associated storage blocks 110 may indicate the availability of the storage blocks 110 with respect to the storage network, which may be used for data allocation and distribution determinations as detailed below.

As mentioned above, the storage network manager 114 may be configured to determine an allocation of data files for storage on the storage blocks 110. In some embodiments, the storage network manager 114 may be configured to determine the allocation of data files for storage on the storage blocks 110 according to a desired redundancy for the data files and/or a desired availability of the data files. In some embodiments, the storage network manager 114 may determine the allocation to the particular storage block 110 based on multiple characteristics associated with the particular storage block 110. The characteristics may be related to the particular storage block 110 directly (referred to as storage block characteristics) and/or related to the device(s) 106 with which the particular storage block 110 may be associated (referred to as device characteristics).

For example, the storage network manager 114 may determine the allocation based on storage capacity of the particular storage block 110, available storage space of the particular storage block 110, storage element type of the particular storage block 110 (referred to hereinafter as "storage block type"), likelihood of loss of the particular storage block 110, availability of the particular storage block 110 with respect to the storage network 102*a*, the device 106 with which the particular storage block 110 is associated, health of the storage block, and/or use of the particular storage block 110.

The storage block type may influence one or more other storage block characteristics. For example, the storage block 110 that is a portable and removable storage block, such as a USB memory stick, may have a relatively high likelihood of loss of its data because it may be relatively easy to lose. Additionally, the storage use of a portable and removable storage block may be different than that of a permanently affixed storage block such as a hard disk drive of a desktop computer. Further, a portable and removable storage block may be less available with respect to the storage network 102*a* because at times it may not be associated with any device 106 such that the data stored thereon may not be available to the devices 106 of the storage network 102*a*.

Additionally, as detailed below, the particular device 106 with which the particular storage block 110 may be included may influence one or more other characteristics associated with the particular storage block 110 as detailed below. Accordingly, the device characteristics may influence the allocation and distribution of data as described below. In some embodiments, the storage network manager 114 may perform the allocation as the characteristics associated with the storage blocks 110 may relate to the desired redundancy and/or availability of the data files.

Device type is a device characteristic that may influence other characteristics associated with the storage blocks 110 that may influence data allocation. The device types may refer to generic categories of devices as well as specific types or models that may be included in the same generic category. By way of example, in the illustrated embodiment, the device 106*a* may be a first device type (e.g., a smartphone), the device 106*b* may be a second device type (e.g., an external hard drive), and the device 106*c* may be a third device type (e.g., a tablet). The device type may also refer to different models of a more generic device type. For example, a device type may be an iPhone® and another device type may be an Android® phone, even though both may also be characterized generically as smartphones. In some embodiments, the device type may be even more specific such as one device type may be an iPhone® 4 and another device type may be an iPhone® 5.

As indicated above, the types of the devices 106 may relate to one or more device characteristics of the devices 106, which may also be closely related to and/or overlap with storage block characteristics. For example, the device characteristics may include, but are not limited to, storage capacity of their respective storage blocks 110, available storage space of their respective storage blocks 110, removability of their respective storage blocks 110, reliability, likelihood of loss of data stored on their respective storage blocks 110, use of the devices 106 (and consequently of their respective storage blocks 110), physical location of the devices 106, location of the devices 106 with respect to each other, on/off status of the devices 106 (current and/or historical), and health of the devices 106. Additionally, the device characteristics may include the connectivity of the devices 106, such as the bandwidth of their respective connections, the network type (e.g., Wi-Fi, cellular, LAN,) used to connect with the other devices 106 as well as the network 112, the connection type (e.g., wireless, wired), connectivity with the other devices 106, latency (current and/or historical) of the devices 106 with respect to transfers of data, speed (current and historical) of transfers of data by the devices 106, monetary cost of the connectivity, etc.

As mentioned above, many device characteristics and/or storage block characteristics may relate to the types of the devices 106. For example, some devices 106 may be able to read, write, and/or access data faster than the other devices 106 depending on the device type. The device characteristics may be related to a more generic device type (e.g., a smartphone versus a tablet) or a more specific device type (e.g., an iPhone® 4 versus an iPhone® 5).

By way of example, in some embodiments, the device 106a may be a smartphone and the device 106c may be an external hard drive. As a result, the storage capacity of the storage block 110a may be less than the storage capacity of the storage block 110c. Further, in this example, the storage block 110a of the device 106a may include flash memory and the storage block 110c of the device 106c may include a hard disk drive, which may have different levels of reliability as compared to solid state memory. Additionally, the likelihood of loss of the device 106a as a smartphone via the device 106a being lost, left, dropped, stolen, water damaged, etc. may be greater than the likelihood of loss of the device 106c as an external hard drive.

Also, the device 106a as a smartphone may be used by a user to access media type files such as pictures, music, and video, while the device 106c as an external hard drive may be used primarily by the user as a backup of data, but may not be used often to access the data. Accordingly, the use of the devices 106a and 106c and their respective storage blocks 110a and 110c may also be based on the device types of the devices 106a and 106c. Additionally, the device 106a as a smartphone may be carried by the user of the device 106a in a manner that the device 106a (and its associated components such as the storage agent 104a and the storage block 110a) may have inconsistent, low speed, and/or expensive connectivity to the other devices 106 (and their associated components) of the storage network 102a. In contrast, the device 106c as an external hard drive (and its associated components) may have more consistent connectivity if the device 106c is constantly connected to at least the network 112.

As another example, the device types may also affect the locations of the devices 106. For example, a desktop computer may be in the same location a lot more often than a smartphone or a tablet is in the same location. Additionally, a desktop computer at a user's home may be likely to come into contact with the other devices 106 of the storage network 102a (e.g., smartphones, tablets, etc.) on a fairly consistent basis due to at least many of the other devices 106 likely being in the user's home at one time or another. Accordingly, the device type may also relate to the particular device 106's location with respect to another device 106.

The storage network manager 114 may be configured to determine the storage block characteristics of the storage blocks 110 and may allocate data to the storage blocks 110 based on the storage block characteristics. In some embodiments, the storage network manager 114 may be configured to determine the storage block characteristics based on the devices 106 with which the storage blocks 110 are associated. For example, the storage network manager 114 may be configured to determine the device types of the devices 106 and to determine one or more storage block characteristics and device characteristics based on the device types. Based on the determined characteristics, the storage network manager 114 may allocate data to the associated storage blocks 110.

For example, the device 106a may be a smartphone, which may be determined by the storage network manager 114. The storage network manager 114 may also determine storage block and device characteristics for the device 106a based on the device 106a being a smartphone. For example, the storage network manager 114 may determine storage block and device characteristics that include, but are not limited to, a likelihood of loss of the device 106a and the storage block 110a, reliability of the device 106a, storage capacity of the storage block 110a, available storage space on the storage block 110a, connectivity of the device 106a with the devices 106b and 106c, and use of the device 106a. The storage network manager 114 may accordingly allocate data to the storage block 110a as that data may relate to one or more of the device characteristics of the device 106a and storage block characteristics of the storage block 110a.

For instance, as mentioned above, the likelihood of loss of the device 106a as a smartphone may be relatively high compared to other device types. The storage network manager 114 may accordingly allocate data to the storage block 110a that may also be allocated to other storage blocks 110 associated with the other devices 106 such that if the device 106a is lost, the data stored on the storage block 110a may not be lost. Additionally, the storage capacity of the storage block 110a (and thus the device 106a) may be somewhat limited such that the storage network manager 114 may select a subset of the data stored in the storage network 102a to be stored on the storage block 110a of the device 106a, whereas the storage capacity of the other storage blocks 110 may be such that they may be able to store all of the data stored in the storage network 102a. Also, because users often use smartphones for viewing pictures and videos, as well as listening to music, in these and other embodiments, the storage network manager 114 may allocate data of this type to be stored on the storage block 110a due to the use of the device 106a and the storage block 110a.

Additionally, due to its nature, the device 106a (and consequently the storage agent 104a) as a smartphone may have sporadic, slow, and/or expensive (e.g., via a cellular network and associated data plan) connectivity with the other devices 106 and their associated storage blocks 110 of the storage network 102a. As such, the availability of the storage block 110a and its associated data with respect to the storage network 102a may be somewhat limited. Accordingly, the storage network manager 114 may allocate data to the storage block 110a that may be used more often by the device 106a such that the device 106a may not need to rely on connectivity with the other devices 106 and their associated storage blocks 110 to access the data. Further, the storage network manager 114 may not allocate data to the storage block 110 where the other devices 106 may rely on accessing the data from the storage block 110a because of the reduced availability of the storage block 110a.

As another example, in some embodiments, the device 106c and the storage block 110c may be associated with a glacial storage system. A glacial storage system may be associated with any type of storage scheme that may have significant latencies (e.g., in the order of minutes or even hours) with respect to storing and/or accessing data stored thereon, but that may be fairly reliable. Many times a glacial storage system may be part of a cloud storage service where the storage blocks of the glacial storage system may be offline (e.g., turned off, stored apart from a computing device) and may need to be placed online before data can be stored thereon or accessed therefrom. The storage network manager 114 may allocate data that may not be accessed often to the storage block 110c associated with a glacial storage system such that the latency may be less of an issue than if the data were accessed more often, which may also free up storage space on the storage blocks 110 that may not have such latencies. Additionally, the storage network manager 114 may allocate large portions (if not all) of the data stored in the storage network 102a to the storage block 110c such that the storage block 110c may be used as a backup for data due to the reliable nature of glacial storage systems.

As another example, the particular device 106 may be able to download and/or upload data at a relatively high rate because of the bandwidth of its connections with the network 112 and/or the other devices 106. Accordingly, data with a high likelihood of use may be allocated to the storage block 110 associated with the particular device 106 having the high bandwidth connection such that the data may be more easily transferred to and/or accessed by the other devices 106 from the particular device 106 and its associated storage block 110.

As another example, the particular device 106 and the associated storage block 110 may be configured such that the associated storage block 110 may be removed from the particular device 106. For example, the associated storage block 110 of the particular device 106 may be a removable SD card that may be transferred to another device 106. Due to its removable nature, the removable SD card may have a relatively high likelihood of loss and/or low likelihood of availability with respect to the storage network 102a. Therefore, the storage network manager 114 may allocate data to the storage block 110 that is a removable SD card accordingly. For example, the storage network manager 114 may only allocate data to the storage block 110 that is a removable SD card that is stored on another storage block 110 and/or that is not deemed to be critical if lost.

Location of the devices 106 may also play a role in the allocation of data. For example, the particular device 106 with a device type that is likely to always be in a central location (e.g., a desktop computer in a user's home) may have a high likelihood of being on and reachable such that it would have more consistent connectivity with the other devices 106. As such, allocation of important data to the storage block 110 of the particular device 106 may be prioritized because of the high likelihood of the storage block 110 being accessible as well as the low likelihood of loss, which may be related to the location of the particular device 106 in some instances.

Health of the storage block 110 and/or the device 106 may play a role in the allocation of data in some instances. As the storage block 110 and/or the device 106 are used, they may wear out such that the health of the storage block 110 and/or the device 106 may diminish over time. In some embodiments, the storage network manager 114 may be configured to monitor the health of the storage blocks 110 and/or the devices 106 (e.g., based on use, performance, and/or diagnostic information associated with the storage blocks 110 and the devices 106) and may allocate data accordingly. For example, the storage network manager 114 may not rely on the storage block 110 with diminished health or associated with the device 106 having diminished health for a desired redundancy of data and may therefore discount the contribution of the device 106 with diminished health with respect to the desired redundancy.

In some embodiments, the storage network manager 114 may be configured to monitor the actual use of the devices 106 and/or the storage blocks 110 and to adjust the allocation based on the actual use of the devices and/or the storage blocks 110, which may be different than initial assumptions that may have been made by the storage network manager 114. In some embodiments, the storage network manager 114 may look for patterns in the use of certain device types such that the storage network manager 114 may vary how it allocates data for similar device types based on the patterns of use. For example, the particular storage block 110 may be portable (e.g., the particular storage block 110 may be an SD card or may be included in a laptop computer) such that initial assumptions about the particular storage block 110 may assume sporadic availability and/or a high likelihood of loss. However, the actual use of the particular storage block 110 (and/or its associated device 106) may be such that the particular storage block 110 is constantly available and/or not transported often. Accordingly, the allocation of data to the particular storage block 110 may be modified based on the actual use of the particular storage block 110.

In some embodiments, the storage agents 104 may also report one or more device and storage block characteristics to the storage network manager 114 such that the storage network manager 114 may allocate data to the storage blocks 110 based on the reported characteristics. For example, the storage agent 104a may report available storage space of the storage block 110a to allow the storage network manager 114 to assess how to allocate data to the storage block 110a. Additionally, in some embodiments, the storage agent 104a may report information to the storage network manager 114 with respect to specific uses of the device 106a and/or the storage block 110a such that the storage network manager 114 may allocate data according to the specific uses. In these and other embodiments, the storage network manager 114 may track data that may be stored on the storage blocks 110 of the storage network 102a other than the storage block 110a that is frequently being accessed or called for by the device 106a. The storage network manager 114 may, accordingly, allocate that data, and/or data similar to it, to the storage block 110a such that the data may be stored locally on the storage block 110a for faster, more robust access instead of having to be accessed from another storage block 110 associated with another device 106. Therefore, the allocation may increase the likelihood that data accessed by the device 106a is stored locally on the storage block 110a instead of the storage block 110 remote from the device 106a.

In some embodiments, based on the device types and/or device characteristics, the storage network manager 114 may determine a redundancy value for the storage blocks 110, which may be based on the likelihood of being lost. For example, the storage block 110 associated with a smartphone may have a lower redundancy value than the storage block 110 associated with an external hard drive based on the likelihood of loss of a smartphone as compared to an external hard drive. In these or other embodiments, the storage network manager 114 may be configured to determine an availability value for the storage blocks 110 based on the storage block characteristics, device types, and/or device characteristics. The redundancy and/or availability values may be used to weight and/or rank the storage blocks 110 according to the roles they may play in a desired redundancy and/or availability scheme.

The reliability and/or availability of the particular device 106 or the storage block 110 may change over time as indicated by changes in their respective characteristics. The storage network manager 114 may be configured to monitor these changes and may adjust the characteristics of the particular device 106 or the storage block 110 accordingly. In some embodiments, the storage network manager 114 may be configured to adjust allocation of data according to changes in the characteristics.

The storage network manager 114 may also assign data to the storage blocks 110 based on one or more data characteristics of the data itself. The data characteristics may include, but are not limited to, data size, data type, a desired redundancy for the data, frequency of use of the data, a user preference with respect to the data, information included in the data, time of addition of the data to the storage network 102a and/or the storage agent 104, origination of the data, etc.

For example, a data type may be associated with whether or not the data file is a picture file, a video file, an audio file or a document file. In some embodiments, the storage network manager 114 may be configured to allocate data of certain data types to different storage blocks 110 based on the data types. For example, the storage network manager 114 may be configured to allocate audio files to the particular storage block 110 that may act as a repository for audio files.

Additionally, the storage network manager 114 may direct that data with a high frequency of use be allocated to many, and in some instances all, of the storage blocks 110 within the storage network 102a such that the data with high frequency of use may be easily accessed by the associated devices 106. Similarly, in some embodiments, the data may have a desired availability (e.g., based on a predicted frequency of use of the data) associated with it and the storage network manager 114 may allocate the data to the storage blocks 110 based on roles of the storage agents 104 in achieving the desired availability. For example, the storage network manager 114 may direct that data with a high degree of desired availability be stored on multiple, if not all of, the storage blocks 110 to achieve the high degree of desired availability. As another example, the storage network manager 114 may direct that data with a high degree of desired availability may be stored on the storage block 110 associated with the device 106 that may have relatively consistent connectivity with the network 112 and/or the other devices 106 of the storage network 102a. Therefore, the likelihood of that data being available to the devices 106 may be increased.

As indicated above, in some embodiments, the storage network manager 114 may allocate data to the storage blocks 110 based on user preferences. For example, a user may "pin" particular data to the storage block 110a to indicate that the user desires that the particular data be stored on the storage block 110a. Based on the "pinning" of the particular data, the storage network manager 114 may accordingly allocate the particular data to the storage block 110a. Other examples of user preferences may include the user explicitly indicating that a certain data type (e.g., videos, photos, music, etc.), recently created data, and/or data originated from a certain device 106, be stored on the particular storage block 110.

In some embodiments, the storage network manager 114 may be configured to allocate data to the storage blocks 110 based on the data characteristics as the data characteristics relate to the device characteristics and/or storage block characteristics. For instance, the storage network manager 114 may look at data size and available storage space on the storage block 110a to determine whether to allocate data of a certain size to the storage block 110a. As another example, the device characteristics of the device 106a may indicate heavy use of music files by the user on the device 106a such that the storage network manager 114 may allocate data having a file type associated with music to the storage block 110a. In these or other embodiments, the storage network manager 114 may look at the desired redundancy of the data and the likelihood of loss and/or reliability of the devices 106 in determining to which and/or to how many of the storage blocks 110 to allocate the data. Similarly, in some embodiments, the storage network manager 114 may look at the desired availability of the data and the connectivity of the devices 106 in determining to which and/or to how many of the storage blocks 110 to allocate the data.

As another example, users often access data that is more recently created (newer data) more than data created at an earlier time (older data). Accordingly, the storage network manager 114 may allocate the newer data to the storage blocks 110 associated with the devices 106 of types that the user may be likely to access the data more often. In these or other embodiments, the storage network manager 114 may allocate newer data to the storage blocks 110 associated with the devices 106 that may have a high level of connectivity with the network 112 and/or the other devices 106 such that the newer data may be more easily accessed by the devices 106 even if it is not stored on the devices 106.

Conversely, the storage network manager 114 may allocate older data to the storage blocks 110 associated with the devices 106 that may store the data for backup purposes, but that may not allow for the data to be as readily accessible. For example, newer data may be allocated to the storage blocks 110 associated with the devices 106 that may be smartphones, tablets, personal computers, etc., and older data may be allocated to the storage blocks 110 associated with the devices 106 that may be external hard drives with limited connectivity, cloud storage servers, glacial storage devices, etc.

Further, the storage network manager 114 may be configured to consider the origination of the data during the allocation of the data to the storage blocks 110. For example, the storage network manager 114 may be configured to allocate data created by the device 106a to the storage block 110a because the user may be more likely to desire to access that data on the device 106a based on the data having originated on the device 106a.

In some embodiments, the storage network manager 114 may be configured to rank and allocate the data based on the data characteristics, device characteristics, and/or the storage block characteristics. For example, the storage network manager 114 may be configured to determine an availability rank for data with respect to a desired availability of the data on the devices. The availability rank may be based on one or more of the data characteristics for the data as they may relate to the device and storage block characteristics described above. By way of example, an availability rank of a certain data file with respect to the particular device 106 may be based on use of the particular device 106 with respect to the type of the certain data file, a user preference of the certain data file or type of the certain data file with respect to the particular device 106, frequency of use of the particular device 106 with respect to the certain data file, origination of the certain data file, when the data was created, etc.

Different storage agent characteristics, device characteristics and data characteristics may be given different weights with respect to how they may relate to the ranking. For example, a user preference with respect to storage of a particular data file on the particular storage block 110 may be given a higher weight than location of the device.

After determining the availability ranking for the data files with respect to the devices 106, the storage network manager 114 may initially allocate the data files to the associated storage blocks 110 of the devices 106 based on the availability rankings for the data files and the available storage space on the storage blocks 110. Following the initial allocation based on the availability rankings, the storage network manager 114 may determine whether the initial allocation satisfies a desired redundancy for the data files. If the desired redundancy is not satisfied, the storage network manager 114 may adjust the allocation such that the desired redundancy is satisfied, which may be at the expense of the desired availability as indicated by the availability rankings.

For example, based on the availability rankings, a data file "A" may be ranked as top priority on the storage block 110a, followed by data files "B," "C," "D," and "E," in that order. For the storage block 110b, the data file "C" may be ranked highest, followed by the data files "E," "B," "A," and "D," in that order. Additionally, for the storage block 110c, the data file "A" may be ranked highest, followed by the data files "C," "E," "D," and "B," in that order.

The storage block 110a may have enough available storage space to store the data files "A," "B," "C," and "D" but not "E." Thus "E" may not be initially allocated to the storage block 110a because it has the lowest rank with respect to the storage block 110a. The storage block 110b may have enough available storage space to store the data files "C," "E," and "B," but not "A" and "D." Thus "A" and "D" may not be initially allocated to the storage block 110b because "A" and "D" are the lowest ranked data files with respect to the storage block 110b. The storage block 110c may have enough available storage space to store the data files "A," "C," and "E," but not "D" and "B." Thus, "D" and "B" may not be initially allocated to the storage block 110c because "D" and "B" are the lowest ranked data files with respect to the storage block 110c.

Following the initial allocation of the data files "A," "B," "C," "D," and "E," the storage network manager 114 may determine whether a desired redundancy for the data files "A," "B," "C," "D," and "E" has been met. In this example, the desired redundancy may be that the data files "A," "B," "C," "D," and "E" are stored on at least two storage blocks 110. However, if the initial allocation of this example were to be followed, data file "D" would only be stored on the storage block 110a. Accordingly, the storage network manager 114 may determine whether a reallocation may be performed to achieve the desired redundancy for the data file "D."

For example, the data file "C" is initially allocated to the storage blocks 110a, 110b, and 110c in the present example. Therefore, the allocation of the data file "C" to the storage block 110b or the storage block 110c may be replaced by an allocation of the data file "D" to satisfy the desired redundancy of the data file "D." Selection of the storage block 110b or the storage block 110c for storage of the data file "D" may be based on the relative ranking of the data file "D" with respect to the storage blocks 110b and 110c, the available storage space on the storage blocks 110b and 110c, or any other applicable storage block characteristics of the storage blocks 110b and 110c and/or device characteristics of the devices 106b and 106c as they may relate to the desired redundancy of the data file "D."

In some embodiments, the storage network manager 114 may also be configured to designate the particular storage block 110 as a primary repository of data or secondary repository of the data based on one or more of the storage block characteristics of the particular storage block 110, device characteristics of the device 106 associated with the particular storage block 110 and/or based on one or more of the data characteristics. The storage block 110 acting as a primary repository of particular data may be configured to store "primary" copies of the particular data, which may indicate that the storage block 110 acting as a primary repository of the particular data may be relied upon as providing redundancy for the particular data. By contrast, the storage block 110 acting as a secondary repository of particular data may be configured to store "secondary" copies of the particular data, which may indicate that the storage block 110 acting as a secondary repository of the particular data may not be relied upon as providing redundancy for the particular data. The storage block 110 may be configured to store primary copies of some data while also being configured to store secondary copies of other data. Whether or not the storage block 110 acts as a primary or secondary repository for data may depend on the health of the storage block 110 or its associated device 106 in some instances.

The storage agents 104 may also be configured to remove data from the storage blocks 110 and/or the storage network manager 114 may be configured to instruct the storage agents 104 to remove the data based on the storage block characteristics, device characteristics, and/or data characteristics. For example, when the available storage space of the storage block 110 is at or near capacity, the storage block 110 may delete data with a low ranking (e.g., availability ranking) to make space for other data that may have a higher ranking. As another example, in some embodiments, the storage agents 104 may not be able to remove particular data from a certain storage block 110 when the certain storage block 110 is designated as a primary repository for the particular data without express permission from the storage network manager 114 or from the user after the user has been notified of the possible permanent loss of the particular data. In contrast, in some embodiments, the storage agents 104 may delete data stored on the particular storage block 110 as secondary copies whenever deemed necessary by the storage agents 104 without permission or instruction from the storage network manager 114. Additionally, in some embodiments, the user may "unpin" data from the particular device 106 and/or the storage block 110 such that a priority of maintaining the data on the particular device 106 and/or the storage block 110 may be reduced. A reduced priority of maintaining the data on the particular device 106 and/or the storage block 110 may allow the unpinned data to be removed from the particular device 106 and/or the storage block 110.

In some embodiments, the storage network manager 114 may be configured to determine an overall health of the storage network 102a based on the allocation of data throughout the storage network 102a and the individual devices 106. For example, if data is being stored as primary copies on the devices 106 and the storage blocks 110 that have a relatively high likelihood of loss and/or a relatively low health rating, the health of the storage network 102a may be considered low as compared to data being stored as primary copies on the devices 106 and the associated storage blocks 110 that have a relatively low likelihood of loss and/or a relatively high health rating. As another example, the health of the storage network 102a when the storage network 102a does not satisfy a desired redundancy and/or availability for data may be considered low as compared to when the storage network 102a does satisfy a desired redundancy and/or availability for the data.

The storage network manager 114 may be configured to monitor the device types, device characteristics, device health, data characteristics, etc. on a continuous basis and perform allocation in a manner described above based on changes that may be indicated by the monitoring. Accordingly, the storage network manager 114 may be configured to perform dynamic allocation, where the allocation for the storage blocks 110 may change. Additionally, changes associated with one storage block 110 may affect the allocation of data associated with another storage block 110.

For example, in some embodiments, the particular device 106 with the storage block 110 acting as a primary repository for a particular data file may fail such that a desired redundancy for the particular data file may not be satisfied. The storage network manager 114 may accordingly allocate the particular data file to another storage block 110 and may designate the other storage block 110 as a primary repository for the particular data file based on the failure of the particular device 106 and based on the desired redundancy of the particular data file.

As another example, the particular storage block 110 may be associated with the device 106 that may have had much more limited connectivity with the storage network 102a than previously. The storage network manager 114 may not rely on the particular storage block 110 as much for redundancy and/or availability and may allocate data stored on the particular storage block 110 accordingly.

Figure 1B:
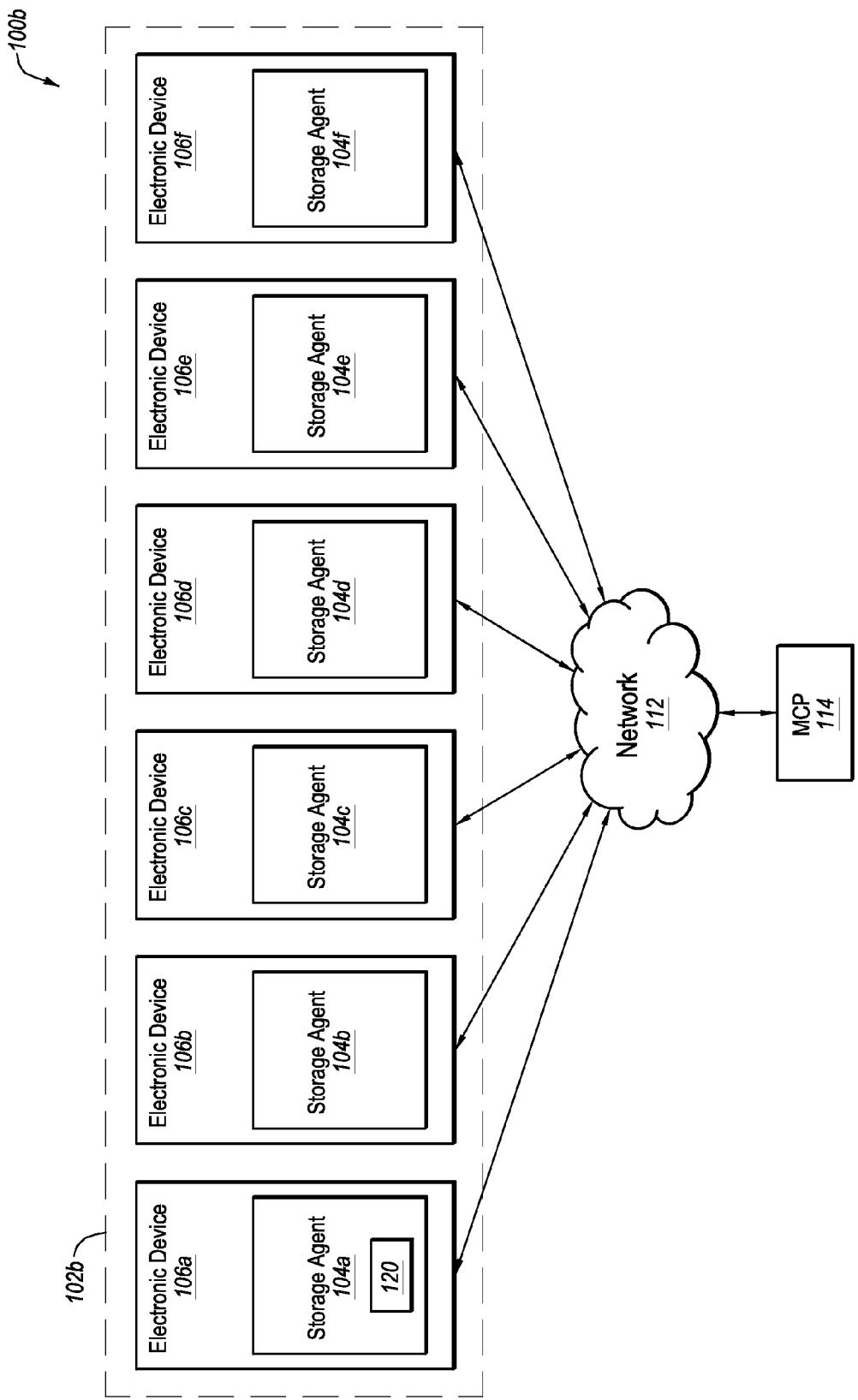
FIG. 1B illustrates an example storage system configured to determine a distribution strategy for distributing data to storage blocks included in a storage network.

As mentioned above, the storage network manager 114 may also be configured to determine a distribution strategy for distributing particular data to the storage blocks 110 to which the particular data has been allocated. FIG. 1B illustrates an example storage system 100b configured to determine a distribution strategy for distributing data to the storage blocks 110, according to at least one embodiment of the present disclosure.

The storage system 100b may be an expanded example of the storage system 100a of FIG. 1A. For example, the storage system 100b may include the network 112, the storage network manager 114, and the devices 106a-106c with their associated storage agents 104a-104c and the storage blocks 110a-110c. However, the storage system 100b may differ from the storage system 100a in that a storage network 102b of the storage system 100b may be depicted with more devices 106 and the associated storage agents 104 and the storage blocks 110 than the storage network 102a of the storage system 100a. For example, the storage network 102b is depicted as including devices 106d, 106e, and 106f with the associated storage agents 104d, 104e, and 104f, respectively, and the storage blocks 110d, 110e, and 110f, respectively, which are not depicted in the storage network 102a of FIG. 1A.

Although, the devices 106a-106f are not depicted in FIG. 1B with all of the elements (e.g., controller, processor, memory, and communication module) as the devices 106a-106c of FIG. 1A, those elements may be included in the devices 106a-106f and are merely not depicted in FIG. 1B. Additionally, the expansion of the storage network 102b with respect to the storage network 102a is to facilitate describing the determination of the distribution strategy and is not limited to storage networks having only the same number of devices 106 and the storage agents 104 as the storage network 102b.

The storage network manager 114 may be configured to determine distribution strategies for distributing the allocated data to the storage blocks 110 based on the characteristics of the storage blocks 110, the devices 106 and/or the data characteristics of the data allocated to the storage blocks 110. In these or other embodiments, the storage network manager 114 may be configured to determine a distribution strategy for particular data based on the data characteristics and/or allocation of other data as well as the different storage blocks 110 to which the particular data may be allocated.

For example, in some embodiments, the storage block 110a may have data 121-stored thereon that has been allocated for storage on the storage block 110f such that the storage block 110a may be a host storage block and the storage block 110of may be a target storage block with respect to the data 121. The storage network manager 114 may be configured to determine a distribution strategy for distributing the data 121 from the storage block 110a to the storage block 110of based on one or more characteristics associated with the devices 106a-106f and/or the storage blocks 110a-110f. In these or other embodiments, one or more other storage blocks 110 may be host storage blocks or target storage blocks of the data 121. Once the distribution strategy has been determined, one or more of the storage agents 104 may be configured to execute the distribution strategy.

In some embodiments, a characteristic that may be used by the storage network manager 114 for determining the distribution strategy may be connectivity of the devices 106a-106f with respect to the storage network 102b (e.g., the connectivity of the devices 106a-106f with respect to each other). For example, the devices 106a and 106f may not be able to communicate with each other, but the device 106b may be able to communicate with both the devices 106a and 106f. A situation like this may occur, by way of example, when the devices 106a and 106b are both connected (e.g., through a wireless or wired connection) to the network 112 and the device 106f is not connected to the network 112 but is connected to the device 106b. In instances such as these, the storage network manager 114 may be configured to determine a distribution strategy from the storage block 110a to the storage block 10f where the storage agent 104a may relay the data 121 or a copy of the data 121 to the storage agent 104b, which may then relay the data 121 to the storage agent 104f, which may direct that the data 121 be stored in the storage block 110f.

Another characteristic that may be used by the storage network manager 114 for determining the distribution strategy may be the types of connections of the devices 106a-106f with each other. For example, the devices 106a and 106f may be connected to each other via the network 112. Additionally, the device 106a may be connected to the network 112 through a non-cellular wireless Internet connection (e.g., Wi-Fi) while the device 106f may be connected to the network 112 via a cellular network connection. Therefore, distributing the data 121 from the storage block 110a of the device 106a to the storage block 110f of the device 106f via the network 112 may use data in an associated cellular data plan, which may have a higher cost than if a non-cellular connection were used. However, the device 106b may be directly connected to the device 106f and may also be connected to the network 112 via a non-cellular wireless Internet connection. Accordingly, in some embodiments, the storage network manager 114 may determine a distribution strategy where the data 121 is relayed by the storage agent 104a from the storage block 110a to the storage agent 104b and then from the storage agent 104b to the storage agent 104f for storage on the storage block 110of. Therefore, the cost of the transfer may be less than if a transfer from the device 106a to the device 106f via the network 112 were used. As another example, the storage network manager 114 may determine a similar distribution strategy in instances where the devices 106a and 106f may be connected to each other and the device 106b (e.g., directly or via the network 112), but the bandwidths of their respective connections with the device 106b may be higher than the bandwidth of the connection between the devices 106a and 106f.

Another device characteristic used by the storage network manager 114 for determining the distribution strategy may be the frequency of connections of the devices 106a-106f. For example, the device 106e may be connected to the device 106f more often than the device 106e is connected to the device 106a. In these and other embodiments, when the device 106f is not connected to any other device 106 of the storage network 102b that is also connected to the device 106a, but the devices 106a and 106e are connected to each other, the storage network manager 114 may determine a distribution strategy where the storage agent 104a may distribute the data 121 to the storage agent 104e. The distribution strategy may then direct the storage agent 104e to distribute the data 121 to the storage agent 104f when the devices 106e and 106f are connected, which may be likely to occur sooner than the device 106a being connected to the device 106f.

In some embodiments, the frequency and/or quality of connections between the devices 106 may be related to how often the devices 106 are in the same vicinity with each other. Accordingly, in some embodiments, the storage network manager 114 may also consider the locations of the devices 106 with respect to each other as a device characteristic when determining the distribution strategy.

In some embodiments, the distribution strategy may be based on a characteristic such as general connectivity of the devices 106 as well as redundancy or availability provided by the devices 106 and their corresponding storage blocks 110. For example, the storage block 110a may have other data than just the data 121 stored thereon and the other data may be allocated for storage on the other storage blocks 110. Additionally, the amount of data that may be distributed from the storage block 110a by the storage agent 104a to the other storage agents 104 and the storage blocks 110 may be limited at any one time due to the connectivity (e.g., due to its bandwidth) of the device 106a with the storage network 102b. Accordingly, in some embodiments, the storage network manager 114 may determine a distribution strategy of the data 121 and the other data stored on the storage block 110a according to an assigned rank of the storage block 110f with respect to the data 121 as compared to an assigned rank of another target storage block with respect to the other data stored on the storage block 110a.

By way of example, the other data stored on the storage block 110a may be allocated for the storage block 110b and the data 121 stored on the storage block 110a may be allocated for the storage block 110f. Additionally, due to connectivity limitations, the storage agent 104a may not be able to transfer the other data to the storage agent 104b and the storage block 110b while also transferring the data 121 to the storage agent 104f and the storage block 110f at the same time. Further, the other data may have a higher rank for storage on the storage block 110b than the data 121 may have for storage on the storage block 110f. Accordingly, the distribution strategy may call for distribution of the other data to the storage block 110b before distribution of the data 121 to the storage block 110f.

The storage network manager 114 may also determine the distribution strategy based on the allocation of data on other devices as well as the above listed device and storage block characteristics. For example, the storage block 110a may have a relatively large amount of data, including the data 121, stored thereon that has been allocated for a large number of target storage blocks. Additionally, the storage block 110d may have a relatively small amount of data, including the data 121 (not expressly depicted as being stored on the storage block 110d), stored thereon that has been allocated for a relatively small number of target storage blocks. Accordingly, the storage network manager 114 may determine a distribution strategy where the data 121 may be distributed from the storage block 110d to the storage block 110f instead of from the storage block 110a such that the storage agent 104a may distribute the other data stored on the storage block 110a without having to also distribute the data 121.

Similarly, in some embodiments, the data 121 may be allocated to the storage block 110e and the storage block 110f as target storage blocks, but may initially only be stored on the storage block 11a. Additionally, the storage block 11a may have a relatively large amount of data stored thereon that has been allocated for a relatively large number of target storage blocks. Accordingly, the storage network manager 114 may determine a distribution strategy where the data 121 may be distributed from the storage block 110a to the storage agent 104e (which may store the data 121 on the storage block 110e) and then from the storage agent 104e to the storage agent 104f (which may store the data 121 on the storage block 110f) or from the storage block 110a to the storage agent 104f (which may store the data 121 on the storage block 110f) and then from the storage agent 104f to the storage agent 104e (which may store the data 121 on the storage block 110e). Therefore, the storage agent 104a may distribute other data to other storage blocks after distributing the data 121 once instead of having to distribute the data 121 multiple times before moving on to distributing the other data.

Moreover, the storage network manager 114 may be configured to determine the distribution strategy based on a power status of the devices 106. The power status may indicate whether the particular device 106 is plugged in or running on battery power. Additionally, the power status may indicate how much charge may be remaining in the battery. In some embodiments, the storage network manager 114 may determine a distribution strategy where the devices 106 that are plugged in are prioritized as transferring data over those that are running on battery power to help conserve the battery power. Further, in these or other embodiments, the devices 106 with more battery life than the other devices 106 may also be prioritized for transferring data over the other devices with less battery life.

The storage network manager 114 may also determine the distribution strategy based on the data characteristics of the data that is to be distributed. For example, the storage network manager 114 may determine that a certain data type may have a higher distribution priority than another data type. Accordingly, the storage network manager 114 may develop a distribution strategy such that data that is of a higher priority data type is distributed to target storage blocks before data of a lower priority data type.

As another example, the storage network manager 114 may develop a distribution strategy where data with a higher desired redundancy and/or accessibility may be distributed to its target storage blocks before data with a lower desired redundancy and/or accessibility. For example, the storage network manager 114 may prioritize the distribution of data files that are to be stored as primary copies on target storage blocks over the distribution of data files that may be stored as secondary copies on their target storage blocks.

Further, in some embodiments, the storage network manager 114 may determine the distribution strategy based on the device characteristics and how they may relate to the data characteristics. For example, in some embodiments, the data 121 may be allocated for storage as a primary copy on the storage agents 104e and 104f. Additionally, the device 106e may be a smartphone and the device 106f may be a desktop computer. Accordingly, the storage network manager 114 may determine a distribution strategy where the data 121 is prioritized for distribution to the storage block 110f over distribution to the storage block 110e because the device 106f may be more reliable than the device 106e.

As another example, the data 121 may be a music file allocated for the storage blocks 110e and 110f. The storage network manager 114 may observe that the device 106e may have accessed music much more often than the device 106f. Accordingly, in some embodiments, the storage network manager 114 may determine the distribution strategy based on the data type (e.g., music file) and device use (e.g., access music often) such that distribution of the data 121 to the storage block 110e is prioritized over distribution to the storage block 110f because of the high use of the device 106e for listening to music as compared to the device 106f.

Additionally, in some embodiments, the storage network manager 114 may determine the distribution strategy based on user preferences. For example, in some embodiments, the user may indicate a desire that the data 121 be stored on the storage block 110f. The storage network manager 114 may therefore develop a distribution strategy that prioritizes distributing the data 121 to the storage block 110f over the other storage blocks 110 that may also be target storage blocks for the data 121.

Further, in some embodiments, the storage network manager 114 may determine the distribution strategy for the data 121 based on the size of the data 121. For example, when the data 121 is relatively large and would use a relatively large amount of bandwidth, the storage network manager 114 may determine a distribution strategy for the data 121 that schedules the distribution of the data 121 at a time where there may be relatively low use of communication resources, such as late at night.

In these or other embodiments, the storage network manager 114 may determine the distribution strategy based on the time when the data 121 is added to the storage network 102b. For example, when the data 121 is relatively new data, the data 121 may be more likely to be accessed than when the data 121 is relatively older data. Accordingly, the distribution strategy may prioritize distribution of the data 121 over older data but not over newer data.

As indicated above, the storage network manager 114 may communicate the distribution strategy for particular data to one or more applicable storage agents 104. The applicable storage agents 104 may then use the distribution strategy as a baseline in determining how to retrieve the particular data (e.g., via a peer-to-peer communication established between the storage blocks 110, described further below). For example, the distribution strategy may provide a prioritized list of the storage blocks 110 from which to retrieve the particular data and/or a prioritized list of which data of the particular data to retrieve first. However, in some instances, the prioritized list of the storage blocks 110 may become stale because the prioritized list may be generated by the storage network manager 114 periodically based on snapshot information received by the storage network manager 114. Therefore, in some embodiments, the storage agents 104 may be configured to determine a transfer strategy to retrieve the particular data. The transfer strategy may be initially based on the received distribution strategy, but may also be configured to leverage other data (e.g., real-time data) that may be available to the storage agents 104. In these or other embodiments, the transfer strategy may be based on location information of the data, assignment information of the data, the device types of the devices 106, peer-to-peer reachability between the devices 106 and/or presence information indicating the "presence" of the devices 106 and their associated storage blocks 110 and the storage agents 104 with respect to the storage network 102b.

The location information may indicate which the storage blocks 110 may include which data stored thereon. Additionally, in some instances, the storage block 110 may include a portion of a data file, but not the entire data file stored thereon. For example, when a substantially large data file is being transferred to the storage block 110, the storage block 110 may have only a portion of that data file stored thereon. Additionally, in some instances a data transfer may be interrupted such that a portion of an associated data file may be stored on the storage block 110. In these and other embodiments, the location information may also indicate when the storage block 110 includes a partial data file instead of the entire data file.

In some embodiments, location information of particular data may be included in metadata associated with the particular data. In some embodiments, the metadata associated with the particular data may include a list of which storage blocks 110 have the particular data stored thereon. For example, metadata associated with the data 121 may include a list of which storage blocks 110 have the data 121 stored thereon, which may include the storage block 110a. As mentioned above, although not expressly indicated in FIG. 1B, more storage blocks 110 in addition to the storage block 110a may have the data 121 stored thereon and may be included in the list. Therefore, in these and other embodiments, the metadata indicating which storage blocks 110 have the data 121 stored thereon may be included in the catalog associated with the storage network 102b. Additionally, in instances when a data file may be stored across different storage blocks 110 and/or when a partial data file is stored on the storage block 110, the metadata may indicate which portions of the data file are stored on which storage blocks 110.

Assignment information may indicate which data is allocated to the particular storage block 110, e.g., as determined by the storage network manager 114 detailed above. Additionally, the assignment information may include the distribution strategy for how the particular storage agent 104 associated with the particular storage block 110 may effectuate obtaining the data included in the assignment information. Further, in these or other embodiments, the assignment information may include a list of one or more storage blocks 110 that may function as fallback storage blocks that may be used for retrieving data in general. An example of a fallback storage block may include the storage block 110 that includes stored thereon a large portion (e.g., all) of the data stored in the storage network 102b. Therefore, the fallback storage block may likely be used for retrieving particular data as a fallback when the particular storage agent 104 is unable to obtain the particular data from the other storage blocks 110 that may be included in the distribution strategy. As such, the fallback storage block(s) not necessarily be included in the distribution strategy associated with the particular data, but may be included in the assignment information that may be received by the particular storage agent 104.

For example, the storage agent 104f may receive assignment information from the storage network manager 114 indicating that the data 121 is allocated for storage on the storage block 110f. Additionally, the assignment information may include a distribution strategy for how the storage agent 104f may retrieve the data 121 from one of the storage blocks 110 that may have the data 121 (or a portion of the data 121) stored thereon. By way of example, the distribution strategy for the data 121 may include an ordered list of the storage blocks 110 that have the data 121 stored thereon. The list may be ordered according to prioritization as to from which storage block 110 the storage agent 104f may attempt to retrieve the data 121. In some embodiments, the prioritization may be determined by the storage network manager 114 using the principles described above with respect to the distribution strategy. For example, an ordered list for retrieval of the data 121 by the storage agent 104f may be determined by the storage network manager 114 using the principles described above with respect to the distribution strategy. The ordered list may include the storage block 110a as top priority such that the storage agent 104f may attempt to retrieve the data 121 from the storage block 110a before attempting to retrieve the data 121 from another storage block 110 that may be included in the ordered list.

Additionally, the assignment information received by the storage agent 104f may include a list of one or more storage blocks 110 that may function as fallback storage blocks from which the storage agent 104f may attempt to retrieve the data 121 (or other data) when the storage agent 104f is unable to retrieve the data 121 (or the other data) from the storage blocks 110 indicated in the distribution strategy.

As indicated above, in some embodiments, the distribution strategy included in the assignment information may be based on presence information. Additionally, in these or other embodiments, the transfer strategy may also be based on the presence information. The presence information may relate to the "presence" of the devices 106 and associated storage blocks 110 with respect to the storage network 102b. In some embodiments, the presence information for the particular device 106 and/or the particular storage block 110 may be determined by the storage agent 104 that is associated with the particular device 106 and/or the particular storage block 110. In some embodiments, the storage agents 104 may determine the presence information for their associated storage blocks 110 and the devices 106 and may communicate the presence information to the storage network manager 114. The storage network manager 114 may then communicate the presence information to the other storage agents 104 of the storage network 102b. In these or other embodiments, the storage network manager 114 may communicate the presence information to the other storage agents 104 with assignment information communicated to the other storage agents and/or in a separate communication.

The "presence" of the storage block 110 and/or the associated device 106 and the associated "presence" information may indicate the ability to communicate information from one storage block 110 to another storage block 110 such that it may be useful in determining the distribution strategy. For example, in some embodiments, the presence information may include whether or not the storage block 110 is active or missing with respect to the storage network 102b, public and/or private Internet protocol (IP) addresses used by the devices 106 associated with the storage blocks 110, IP protocol version (e.g., IPv4 vs. IPv6) used by the devices 106, type of connection (e.g., wired, wireless, Wi-Fi, cellular, etc.) used to connect the associated devices 106 with the storage network 102b, signal strength of the connection, available data rate of the connection, bandwidth of the connection, power state (e.g, charging, discharging, etc.) of the devices 106 associated with the storage blocks 110, battery level of the devices 106 associated with the storage blocks 110, physical location of the storage blocks 110 (e.g., based on global positioning system (GPS) information), "nearby" storage blocks 110 associated with the devices 106 that are sharing the same local network, and/or Network Address Translation (NAT) characteristics associated with the connection of the associated devices 106.

Determining the distribution strategy based on connectivity type (e.g., wired, wireless, Wi-Fi, cellular, etc.), available data rate, bandwidth, power state (e.g, charging a battery via an AC source, discharging the battery, etc.), and/or battery level is described in detail above. The public and/or private Internet protocol (IP) addresses used by the devices 106 may enable a determination as to which Internet service provider(s) (ISP) are being used by one or more of the devices 106, which may help in deciding the distribution strategy and transfer strategy since some ISPs may be more preferable than others based on their terms, technology, structure, etc. Additionally, communicating data between the devices 106 that are using the same ISP may be faster than communicating data between the devices 106 that are using a different ISP.

The physical locations of the devices 106 may be used to determine which of the devices 106, and consequently their associated storage blocks 110, may be physically located relatively close to each other. In some embodiments, the distribution strategy and/or transfer strategy may favor the communication of data between the storage blocks 110 that are relatively close to each other as compared to between the storage blocks 110 that are further apart. Similarly, communication of data between the storage blocks 110 whose associated devices 106 are connected to the same local network may be faster, better, and/or easier than between the storage blocks 110 whose associated devices 106 are not connected to the same local network. Therefore, in some embodiments, the distribution strategy and/or transfer strategy may favor the communication of data between the storage blocks 110 who may be connected to the same local network based on their associated devices 106 being connected to the same local network.

The NAT characteristics associated with the devices 106 may also be used to determine the peer-to-peer reachability of the storage block 110 associated with one device 106 with respect to another storage block 110 associated with another device 106. In the present disclosure peer-to-peer reachability between the storage blocks 110 may be based on the peer-to-peer reachability of their associated devices 106 such that reference to "peer-to-peer reachability between the storage blocks 110" may also refer to the peer-to-peer reachability between their associated devices 106. The peer-to-peer reachability between the storage blocks 110 may indicate whether data may be transferred between the corresponding storage blocks via a peer-to-peer connection. Further, when the storage agents 104 are included in the devices 106 that are to establish a peer-to-peer connection, the peer-to-peer reachability of the corresponding devices 106 may also refer to the peer-to-peer reachability of the corresponding storage agents 104, or vice versa.

The peer-to-peer reachability between the storage blocks 110 and the devices 106 may be based on the NAT characteristics of the corresponding NATs. Therefore, in some embodiments, the storage agents 104 may use the NAT characteristics to determine the peer-to-peer reachability between their associated storage blocks 110. The NAT characteristics may include NAT types, NAT binding behavior, NAT filtering behavior, NAT hairpinning behavior, etc.

In some embodiments, the storage agents 104 may periodically provide NAT characteristic updates to the storage network manager 114 of the NAT associated with the network connections used by the devices 106 of the storage blocks 110 of which they may be managing. Therefore, the storage agents 104 may know the NAT (and associated NAT characteristics) associated with the network connections used by the devices 106 that may include the storage blocks 110 of which they may not be associated. The particular storage agent 104 may then determine the peer-to-peer reachability of its associated storage blocks 110 with the other storage blocks 110 (e.g., via peer-to-peer connections between their associated devices 106) based on the NAT characteristics.

Depending on how compatible different NATs are with each other for peer-to-peer communication, different levels of peer-to-peer reachability may be obtained using various techniques. For example, some NATs may be compatible such that they may support direct peer-to-peer connections between the devices 106.

Other NATs may have compatibility issues such that a direct peer-to-peer connection may not be established. In some of these embodiments, an intermediary device or server (e.g., a TURN server) with which both NATs may be compatible may be used as a relay between the two NATs such that a peer-to-peer connection may be established. A relay peer-to-peer connection may be less desirable than a direct peer-to-peer connection because the relaying may cause delays and/or be less secure than a direct peer-to-peer connection.

Further, in some instances, two NATs may be incompatible for a direct peer-to-peer connection and a relay peer-to-peer connection may not be available or possible such that a peer-to-peer connection may not be established. For example, when a first device 106 is connected to an IPv4-only network and a second device 106 is connected to an IPv6-only network, the first device 106 and the second device 106 (and their associated storage blocks 110) may not be peer-to-peer reachable. Therefore, the peer-to-peer reachability may refer to whether a direct peer-to-peer connection may be established, a relay peer-to-peer connection may be established, and/or no peer-to-peer connection may be established.

In some instances, some NATs may be known to be compatible with each other such that the storage agents 104 may direct the applicable devices 106 to make peer-to-peer connections based on the known compatibility. In other instances, it may be unknown whether or not the NATs are compatible, and the storage agents 104 may direct the applicable devices 106 to attempt to make a direct peer-to-peer connection before attempting to make a relaying peer-to-peer connection to see if the direct peer-to-peer connection may be established. If the direct peer-to-peer connection fails, establishment of a relaying peer-to-peer connection may be attempted. If establishment of a relaying peer-to-peer connection fails, it may be determined that the corresponding devices 106 and their associated storage blocks 110 may not be peer-to-peer reachable. Depending on how the peer-to-peer connection is established, a peer-to-peer reachability status may also be determined. In some embodiments, the storage agents 104 may remember the peer-to-peer reachability status between the devices 106 for future communications until an applicable NAT characteristic or configuration changes.

In some embodiments, the storage agents 104 may prioritize storage blocks 110 for retrieval of data based on the peer-to-peer reachability status. For example, the storage blocks 110*a* and 110*b* may have particular data stored thereon that may be retrieved for storage on the storage block 110*c*. Additionally, the peer-to-peer reachability status between the device 106*a* and the device 106*c* may indicate a direct peer-to-peer reachability between the device 106*a* and the device 106*c*. Further, the peer-to-peer reachability status between the device 106*b* and the device 106*c* may indicate a relay based peer-to-peer reachability between the device 106*b* and the device 106*c*. Therefore, the storage agent 104*c* may prioritize retrieval, for storage on the storage block 110*c*, of the particular data from the storage block 110*a* over the storage block 110*b* based on the better peer-to-peer reachability between the device 106*a* and the device 106*c* than that between the device 106*b* and the device 106*c*.

Further, as indicated above, the transfer strategy of specific data may be based on the device types of the devices 106 associated with the storage blocks 110 that may include the specific data stored thereon. For example, some device types may be ordered into different classes such as a home data center (HDC) class device, a desktop class device, a laptop class device, a mobile data center (MDC) class device, and/or a general mobile class device.

An HDC class device may be a special-purpose storage device that may include a large amount of storage (e.g., that may include one or more storage blocks 110 with a relatively large amount of collective storage space) and that is on most, if not all, of the time. Accordingly, the device 106 that is an HDC class device may have a constant or almost constant presence in the storage network 102*b*. For example, an HDC class device may reside in a user's home and may be configured to have a constant connection with a Wi-Fi network in the user's home such that the HDC class device may be a node within the storage network 102*b* that includes the storage blocks 110 that may be accessible substantially most, if not all, of the time.

A desktop class device may be any suitable computing device (e.g., a desktop computer) that may also include a significant amount of storage space and that may have at least a semi-permanent location. A laptop class device may also be any suitable computing device (e.g., a laptop computer) that may also include a significant amount of storage space and that may be more mobile than a desktop class device. Laptop class devices may typically have less network connectivity than desktop class devices. An MDC class device may be more mobile than a laptop class device but may also include a significant amount of storage space (e.g., more than a typical smartphone or tablet). MDC class devices may typically have less connectivity than laptop class devices. A general mobile class device may be similar to an MDC class device, but may have significantly less storage space.

In some embodiments, the storage blocks 110 may be prioritized for retrieving a data from based on the device type or device class of their associated devices 106. In some embodiments, the prioritization may be based on storage space, how likely the devices 106 may be connected to a network, how mobile the device is, how likely a data plan may be a concern, and/or how likely battery power may be a concern. By way of example, the storage block 110 that is included with the device 106 categorized as an HDC class device may be prioritized to retrieve specific data from over the storage block 110 that is included with another device 106 that is categorized as a desktop class device (e.g., because the HDC class device may be configured to be on substantially all of the time whereas a desktop class device may be powered off more often). In these or other embodiments, the storage block 110 that is included with the device 106 categorized as a desktop class device may be prioritized to retrieve specific data from over the storage block 110 that is included with another device 106 that is categorized as a laptop class device (e.g., because in general the desktop class device may have better connectivity, power, and/or data storage properties than the laptop class device). Similarly, a laptop class device may be prioritized over an MDC class device and an MDC class device may be prioritized over a general mobile class device based on the general connectivity, storage, and/or power properties of laptop class devices with respect to MDC class devices and MDC class devices with respect to general mobile class devices.

In some embodiments, using the above information, a specific storage agent 104 associated with a specific storage block 110 may generate an ordered list of the other storage blocks 110 from which to fetch specified data that may be stored on the specific storage block 110. The following nomenclature may be used with respect to generation of the ordered list:

$R_{candidate}(Data)$=the ordered list of recommended storage blocks 110 from which to fetch specified data "Data." In some embodiments, $R_{candidate}(Data)$ may be ordered based on lists of the storage blocks 110 used to generate $R_{candidate}(Data)$ that may already be ordered.

$A_{storage\_network}$=list of the storage blocks 110 that are included in the storage network 102b (referred to as "included storage blocks 110").

$A_{storage\ network-device-class}$=list of included storage blocks 110 in "$A_{storage\ network}$" ordered from the most preferred to the least preferred for data retrieval based on device class.

$D_{storage\ network}$=list of the storage blocks 110 that were previously part of the storage network 102b, but that are currently deleted from the storage network 102b. In the present disclosure, the particular storage block 110 may be considered "deleted" from the storage network 102b when the particular storage block 110 has been removed from the storage network 102b on a permanent basis. In some embodiments, the particular storage block 110 may not be deleted from the storage network 102b until it has been verified that the data stored thereon is included on one or more other storage blocks 110 that are not to be removed from the storage network 102b.

$L_{dli}(Data)$=ordered list of the storage blocks 110 of the storage network 102b that include specified data "Data" stored thereon. $L_{dli}(Data)$ may be included in the metadata that may be accessed by the storage agents 104 (e.g., the catalog). Additionally, $L_{dli}(Data)$ may be ordered based on the device class in some embodiments.

$L_{assignment}(Data)$=ordered list of the storage blocks 110 of the storage network 102b (other than the specific storage block 110 associated with the specific storage agent 104) to which the specified data "Data" has been allocated. In some embodiments, $L_{assignment}(Data)$ may be determined by the storage network manager 114 and may be ordered based on the distribution strategy described above.

$L_{fallback}$=ordered list of the storage blocks 110 (other than the specific storage block 110 associated with the specific storage agent 104) that may be used as fallback storage blocks. In some embodiments, $L_{fallback}$ may be determined by the storage network manager 114 and may be ordered based on the distribution strategy described above.

In some embodiments, using the above nomenclature, $R_{candidate}(Data)$ may be determined by the specific storage agent 104 associated with the specific storage block 110 for fetching specific data that is to be stored on the specific storage block 110 as follows below. When the specific storage agent 104 has not received any specific routing information from the storage network manager 114, the specific storage agent 104 may determine "$R_{candidate}(Data)$" based on the following expression:

$$R_{candidate}(Data) = A_{storage\ network-device-class} \cap L_{dli}(Data)$$

In some embodiments, "$L_{dli}(Data)$" and "$A_{storage\ network-device-class}$" may be out of sync with each other such that "$R_{candidate}(Data)$" may be empty after following the above-expression. In these or other embodiments, "$R_{candidate}(Data)$" may be re-determined based on the following expression:

$$R_{candidate}(Data) = L_{dli}(Data) - D_{storage\ network}$$

When the specific storage agent 104 has received specific routing or assignment information from the storage network manager 114, the specific storage agent 104 may determine "$R_{candidate}(Data)$" based on the following expression in some embodiments:

$$R_{candidate}(Data) = L_{assignment}(Data) \cap A_{storage\ network}$$

When the specific storage agent 104 has received specific routing or assignment information from the storage network manager 114 and when "$R_{candidate}(Data)$" is empty after performing the above expression, in some embodiments, "$R_{candidate}(Data)$" may be determined using the following expression:

$$R_{candidate}(Data) = (L_{fallback} \cup (A_{storage\ network} - L_{fallback})) \cap L_{dli}(Data)$$

After determining "$R_{candidate}(Data)$", the specific storage agent 104 may attempt to retrieve the specific data from one or more of the storage blocks 110 included in "$R_{candidate}(Data)$". For example, the storage blocks 110 may be ordered according to retrieval preference in "$R_{candidate}(Data)$" such that the specific storage agent 104 may start with the first storage block 110 included in "$R_{candidate}(Data)$". The retrieval preference may be based on location information of the data, assignment information of the data, the device types of the devices 106, peer-to-peer reachability between the storage blocks 110, and/or presence information, as described above. In some instances, the retrieval may be performed according to method 500 described below with respect to FIGS. 5A and 5B.

The particular storage agent 104 may establish one or more peer-to-peer connections with one or more other storage agents 104 such that data may be sent between the particular storage agent 104 and the one or more other storage agents. A peer-to-peer connection in which the particular storage agent 104 is sending data may be referred to as an "outgoing connection" with respect to the particular storage agent 104. A peer-to-peer connection in which the particular storage agent 104 is receiving data may be referred to as an "incoming connection" with respect to the particular storage agent 104. In some embodiments, the transfer strategy may also dictate the number of incoming and/or outgoing connections that the particular storage agent 104 may participate in at any one time.

The more incoming and/or outgoing connections that the particular storage agent 104 may participate in at any one time may affect the performance and/or concurrency of data transfer as well as network data consumption. Additionally, the number of incoming and/or outgoing connections that the particular storage agent 104 may participate in at any one time may be limited by the possible throughput of each connection and/or the potential throughput of the underlying network.

In some embodiments, the transfer strategy may dictate that each storage agent 104 may have at most $M_i$ total incoming connections and at most $M_o$ outgoing connections at any one time. $M_i$ and $M_o$ may be determined or communicated by the storage network manager 114 in some embodiments. In these or other embodiments, $M_i$ and $M_o$ may be determined based on one or more of the factors such as throughput (e.g., throughput for incoming and/or outgoing connections, total network throughput, etc.), desired performance, concurrency, etc. Additionally, in these or other embodiments, $M_i$ and $M_o$ may vary depending on the device type or device class of the devices 106 associated with the storage agents 104. Further, in some embodiments, $M_i$ may be different from $M_o$ for the same storage agent 104.

In these or other embodiments, the transfer strategy may dictate that each storage agent 104 may have at most $N_i$ incoming connections and at most $N_o$ outgoing connections with any other storage agent 104 at any one time. $N_i$ and $N_o$ may be determined or communicated by the storage network manager 114 in some embodiments. In these or other embodiments, $N_i$ and $N_o$ may be determined based on one or more of the factors such as throughput (e.g., throughput for incoming and/or outgoing connections, total network throughput, etc.), desired performance, concurrency, etc. Additionally, in these or other embodiments, $N_i$ and $N_o$ may vary depending on the device type or device class of the devices 106 associated with the storage agents 104. Further, in some embodiments, $N_i$ may be different from $N_o$ for the same storage agent 104.

Additionally, in some embodiments, the storage agents 104 may be configured to maintain a peer-to-peer connection with another storage agent 104 after a data transfer has occurred in case more data may be transferred shortly thereafter. However, the number of available peer-to-peer connections may be reduced by maintaining the peer-to-peer connection. Accordingly, the storage agents 104 may be configured to timeout and disrupt the peer-to-peer connection after a certain amount of time (e.g., 10 seconds) in which the peer-to-peer connection has been idle has passed. In some embodiments, the timeout time may be determined and/or communicated by the storage network manager 114.

In some embodiments, the particular storage agent 104 may communicate to the storage network manager 114 whether or not the retrieval of particular data for storage on the particular storage block 110 as indicated in assignment information is successful. Further, the particular storage agent 104 may communicate the current state of the particular data after the failed or successful retrieval. The storage network manager 114 may use this information to determine a new distribution strategy for the particular data and/or new assignment information for the particular data and/or for other data. For example, when the retrieval of the particular data is successful, the storage network manager 114 may consider the particular storage block 110 in determining a subsequent distribution strategy for the particular data to the other storage blocks 110. Alternatively, when the retrieval of the particular data is unsuccessful, the storage network manager may modify the distribution strategy based on the information. The report on the particular data may include information regarding the retrieval of a single data file and/or a batch of data that may be included in the assignment information.

Accordingly, the transfer strategy that may be followed by the storage agents 104 may help facilitate the routing and transfer of data between the storage blocks 110. Modifications, additions, or omissions may be made to the storage systems 100a and 100b without departing from the scope of the present disclosure. For example, the storage systems 100a and 100b may include any number of the devices 106, the storage blocks 110, and/or the storage agents 104. Further, the locations of components within the devices 106 are for illustrative purposes only and is not limiting. Additionally, although the allocation and distribution of data is described as being performed by the storage network manager 114 with respect to the storage networks 102a and 102b, the principles and teachings associated with the allocation and/or distribution of data may be applied in and by any suitable element of any applicable storage network and/or storage system. Further, the different steps and processes performed with respect to the transfer strategy may be performed in any number of sequences and/or may be performed with respect to any number of data files sequentially and/or concurrently.

Figure 2:
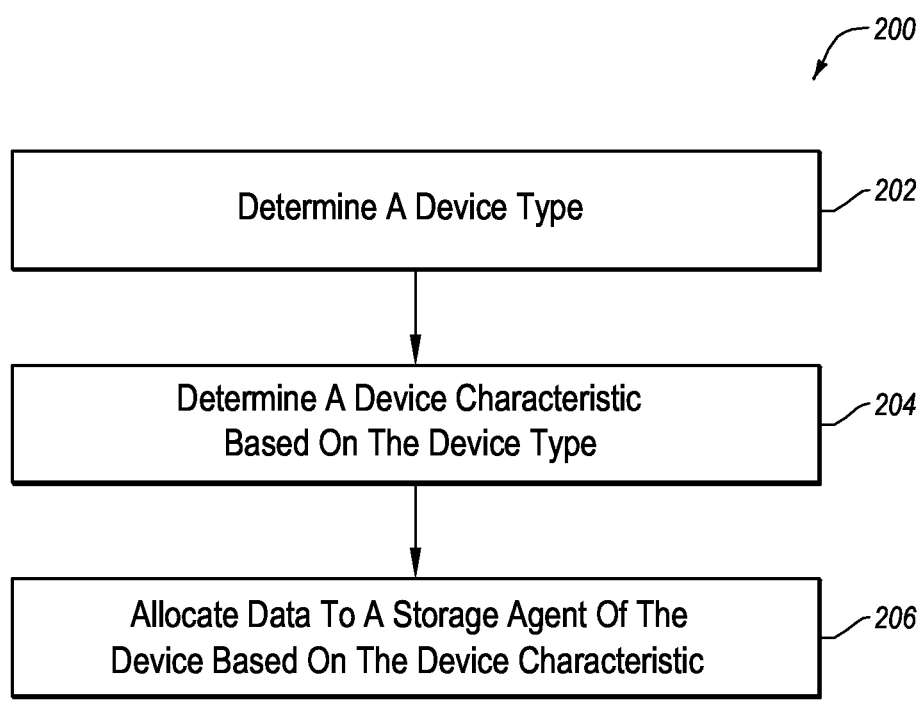
FIG. 2 is a flowchart of an example method of allocating data to a storage block of a storage network.

FIG. 2 is a flowchart of an example method 200 of allocating data to a storage block of a storage network, according to at least one embodiment described herein. One or more steps of the method 200 may be implemented, in some embodiments, by one or more components of the storage systems 100a and/or 100b of FIGS. 1A and 1B, such as the storage network manager 114, the storage agents 104, or the devices 106. Although illustrated as discrete blocks, various blocks may be divided into additional blocks, combined into fewer blocks, or eliminated, depending on the desired implementation.

The method 200 may begin at block 202, where a plurality of characteristics associated with a storage block included in a storage network may be determined. The plurality of characteristics may include storage capacity of the storage block, available storage space of the storage block, likelihood of loss of data stored on the storage block, availability of the storage block with respect to the storage network, and use of the storage block.

At block 204, data may be allocated to the storage block based on the plurality of characteristics. In some embodiments, the allocation may be further based on a type of the storage block, a health of the storage block, a device type of a device associated with the storage block, use of the device, a likelihood of loss of the device, a health of the device, a location of the device, connectivity of the device with the storage network, a cost of connectivity of the device with the storage network, and a reliability of the device.

Accordingly, the method 200 may be performed to allocate data to one or more storage blocks of a storage network based on characteristics associated with the storage blocks. Allocation of data in this manner may provide for an improved user experience and redundancy within the storage network over existing data storage schemes.

One skilled in the art will appreciate that, for the method 200 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 200 may include further steps associated with determining a desired redundancy of the data and determining a redundancy role of the storage block for the data based on the plurality of characteristics. In these and other embodiments, the method 200 may further include allocating the data to the storage block based on the redundancy role of the storage agent.

Further, the method 200 may include steps associated with assigning the storage agent as a primary repository or a secondary repository of the data based on the plurality of characteristics. The method 200 may also include steps associated with allocating the data for storage on the storage block based on a data characteristic of the data. The data characteristic may include any one or more of data type, frequency of use of the data, desired redundancy for the data, size of the data, a ranking of the data, information included in the data, a user preference with respect to the data, time of addition of the data to the storage network and/or a storage agent, origination of the data, etc. In some embodiments, the allocation may be based on how the data characteristic relates to one or more of the plurality of characteristics.

Figure 3:
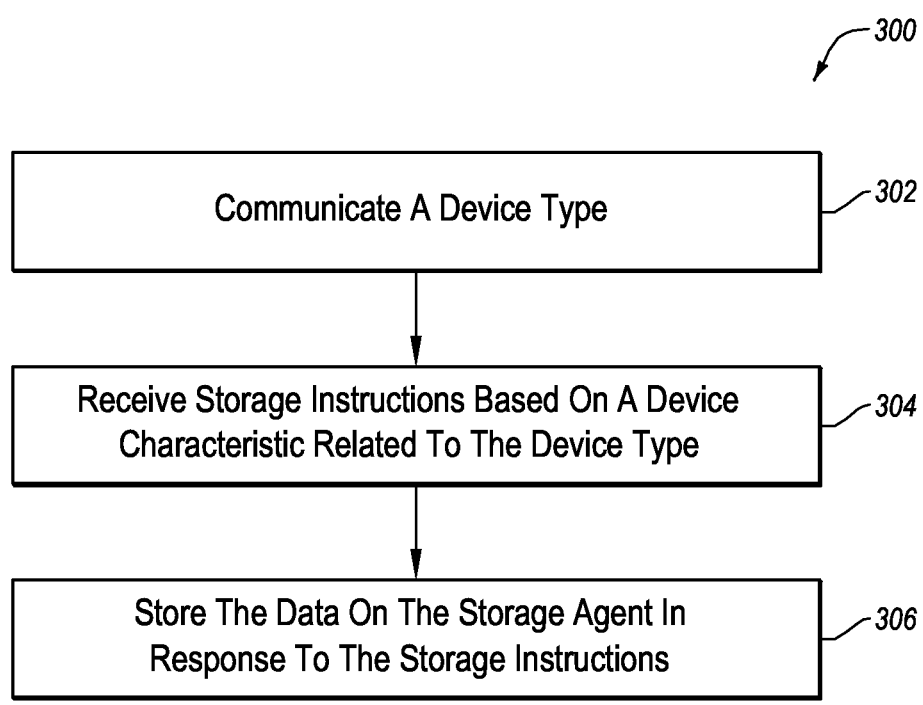
FIG. 3 is a flowchart of an example method of storing data on a storage block of a storage network.

FIG. 3 is a flowchart of an example method 300 of storing data on a storage block of a storage network, according to at least one embodiment described herein. One or more steps of the method 300 may be implemented, in some embodiments, by one or more a components of the storage systems 100*a* and/or 100*b* of FIGS. 1A and 1B, such as the storage network manager 114, the storage agents 104, or the devices 106. Although illustrated as discrete blocks, various blocks may be divided into additional blocks, combined into fewer blocks, or eliminated, depending on the desired implementation.

The method 300 may begin at block 302, where a plurality of characteristics associated with a storage block included in a storage network may be communicated to a storage network manager such as the storage network manager 114 of FIGS. 1A and 1B. The plurality of characteristics may include storage capacity of the storage block, available storage space of the storage block, likelihood of loss of data stored on the storage block, availability of the storage block with respect to the storage network, and use of the storage block.

At block 304, a storage instruction for storing data on the storage block may be received from the storage network controller. The storage command may be based on the plurality of characteristics. At block 306, the data may be stored on the storage block in response to the storage instruction.

Accordingly, the method 300 may be performed to store data on a storage block of a storage network based on characteristics associated with the storage blocks and their associated devices. Allocation of data in this manner may provide for an improved user experience and redundancy within the storage network over existing data storage schemes.

One skilled in the art will appreciate that, for the method 300 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 300 may include steps associated with storing the data on the storage block based on a data characteristic of the data. The data characteristic may include any one or more of data type, frequency of use of the data, desired redundancy for the data, size of the data, a ranking of the data, information included in the data, a user preference with respect to the data, time of addition of the data to the storage network and/or a storage agent, origination of the data, etc.

Figure 4:
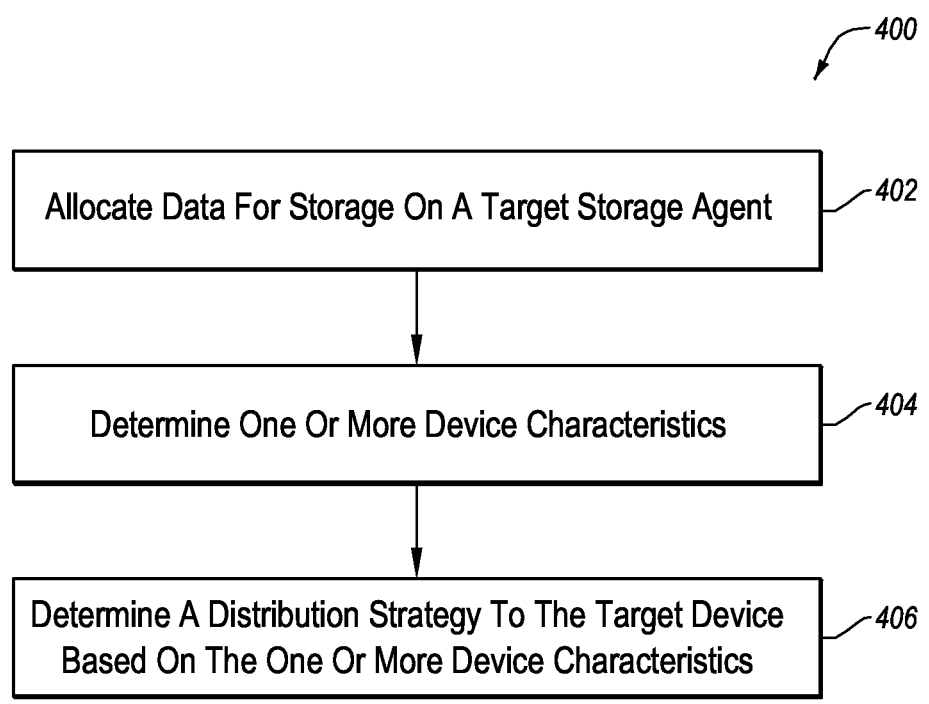
FIG. 4 is a flowchart of an example method of determining a distribution strategy for distributing data to storage blocks of a storage network.

FIG. 4 is a flowchart of an example method 400 of determining a distribution strategy for distributing data to storage blocks of a storage network, according to at least one embodiment described herein. One or more steps of the method 400 may be implemented, in some embodiments, by one or more components of the storage systems 100*a* and/or 100*b* of FIGS. 1A and 1B, such as the storage network manager 114, the storage agents 104, and/or the devices 106. Although illustrated as discrete blocks, various blocks may be divided into additional blocks, combined into fewer blocks, or eliminated, depending on the desired implementation.

The method 400 may begin at block 402, where data stored on a host storage block may be allocated for storage on a target storage block. The host storage block and the target storage block may be included in a storage network that also includes one or more other storage blocks, such as the storage networks 102*a* and 102*b* of FIGS. 1A and 1B. In some embodiments, the allocation may be performed according to the allocation described above. For example, in some embodiments, the allocation may be performed based on a plurality of characteristics associated with the target storage block where the plurality of characteristics may include storage capacity of the storage block, available storage space of the storage block, likelihood of loss of data stored on the storage block, availability of the storage block with respect to the storage network, and use of the storage block. In these or other embodiments, the allocation may be made based on a data characteristic of the data.

At block 404, characteristics of the other storage agents and/or one or more devices associated with the e other storage agents may be determined. The characteristics may include connectivity of the one or more devices with the storage network, a power status of the one or more devices, use of the devices, and locations of the one or more device. As mentioned above, the connectivity of the devices may include cost of the connectivity, frequency of the connectivity, bandwidth of the connectivity, and type of connection.

At block 406, a distribution strategy for distributing the data from the host storage block to the target storage block may be determined based on the characteristics determined at block 404. In some embodiments, the distribution strategy may be based on a rank of the target storage block with respect to the data. In these or other embodiments, the distribution strategy may be determined based on the allocation of the data to other storage blocks and/or the allocation of other data stored on the host storage block.

Additionally, in some embodiments, the distribution strategy may be determined based on one or more data characteristics of the data such as data type, a desired redundancy of the data, a desired availability of the data, size of the data, time of addition of the data to the storage network, and a user preference associated with the data. In these or other embodiments, the distribution strategy may be determined based on how the data characteristics may relate to the characteristics associated with the other storage blocks, the target storage block, and/or the host storage block.

Accordingly, the method 400 may be performed to determine a distribution strategy for data. Distribution of data in this manner may provide for an improved user experience and redundancy within a storage network over existing data storage schemes.

One skilled in the art will appreciate that, for the method 400 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5A:
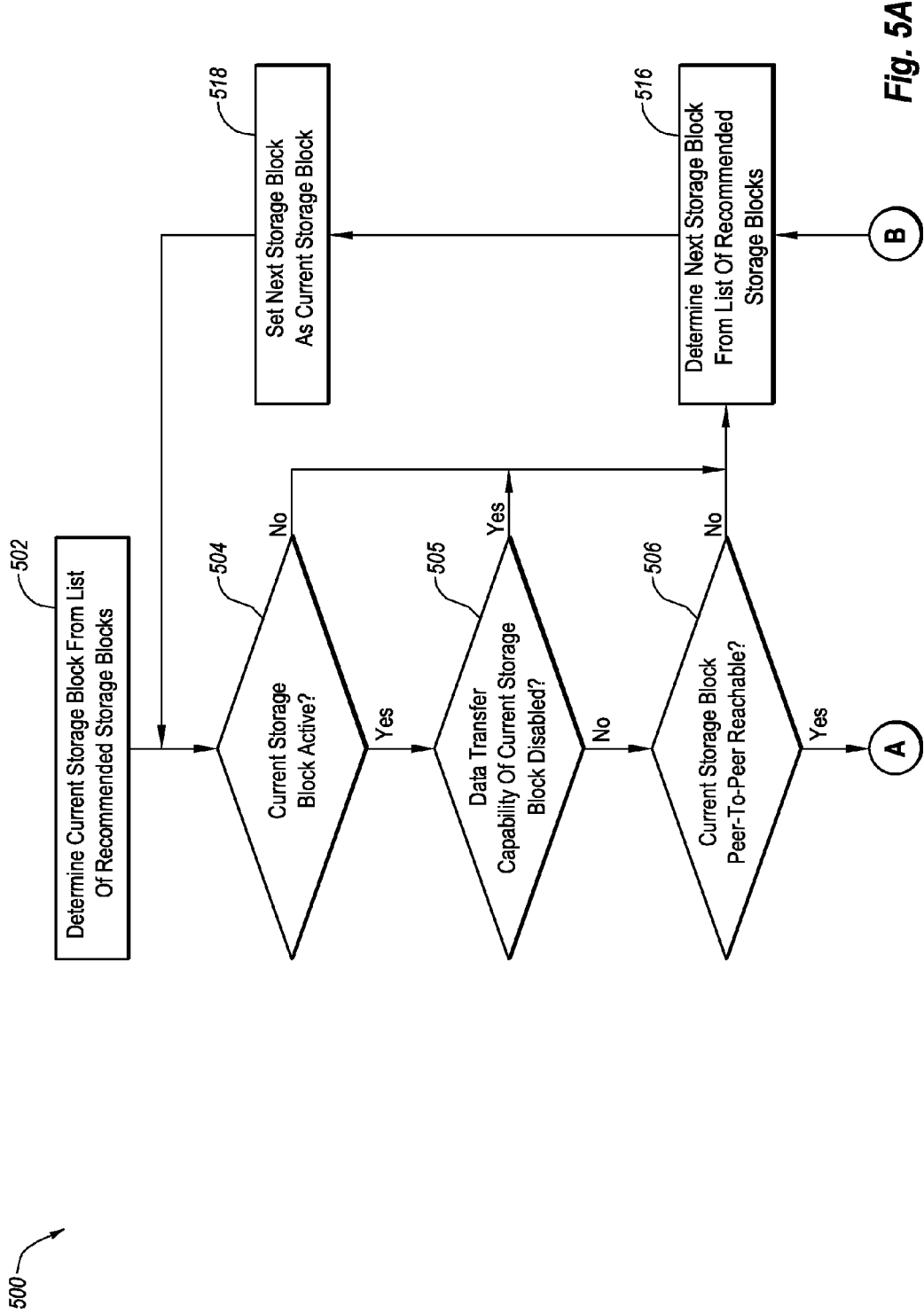
FIG. 5A is a flowchart of an example method of retrieving data in a storage network.
Figure 5B:
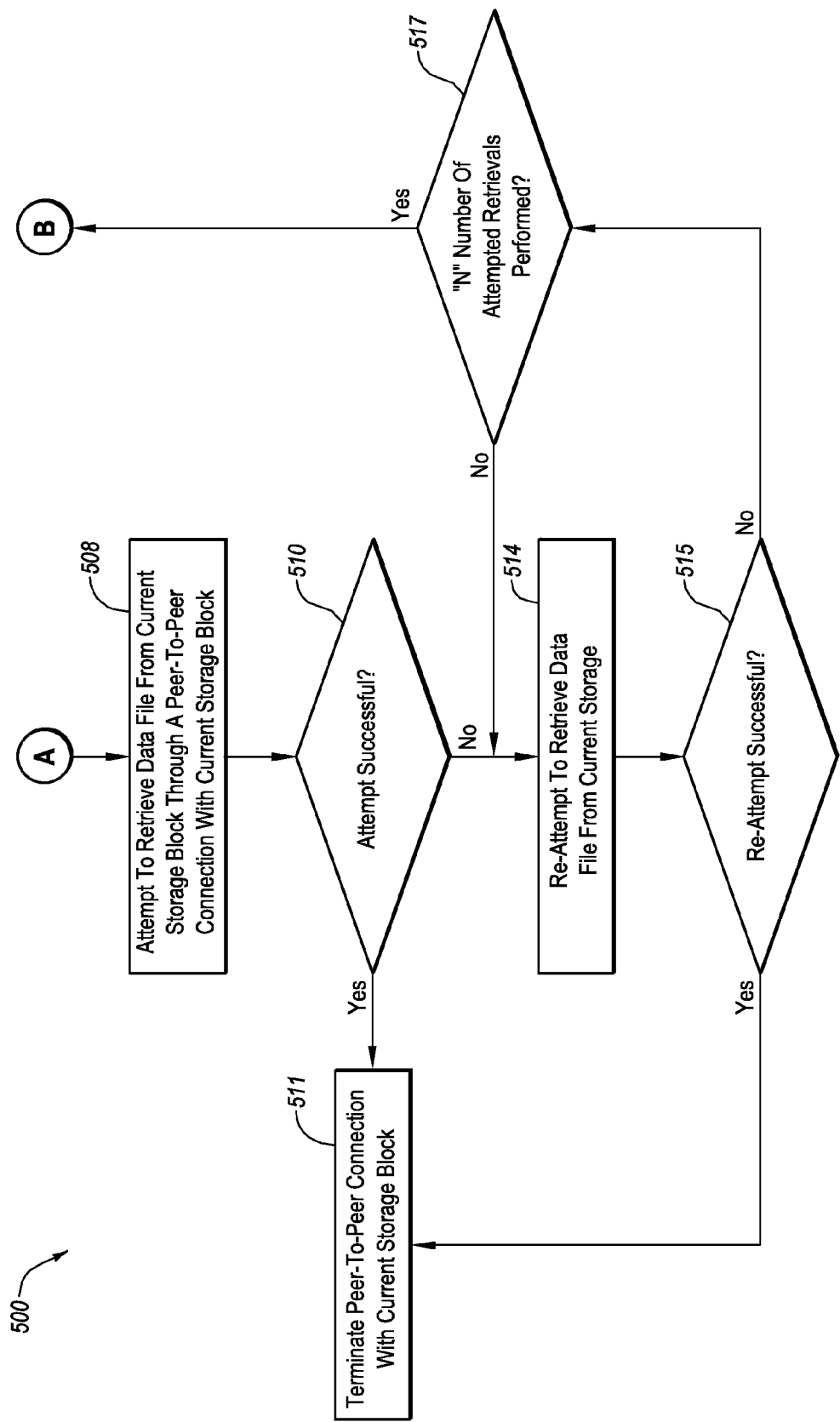
FIG. 5B is an extension of the flowchart of FIG. 5A.

FIGS. 5A and 5B depict a flowchart of an example method 500 of retrieving data from a storage block of a storage network, according to at least one embodiment described herein. One or more steps of the method 500 may be implemented, in some embodiments, by one or more components of the storage systems 100a and/or 100b of FIGS. 1A and 1B. For example, as indicated above, in some instances, the method 500 may be performed by a storage agent, such as the storage agent 104 of FIGS. 1A and 1B, to retrieve data, or a portion of the data, (e.g., a data file or a portion of the data file) from a storage block not managed by the storage agent for storage on a target storage block managed by the storage agent. The storage agent configured to manage the target storage block may be referred to as a "target storage agent." Additionally or alternatively, the method 500 may be performed with respect to a list of recommended storage blocks from which the storage agent may retrieve the data for storage on a target storage block that may be managed by the storage agent. In some embodiments, the list of recommended storage blocks may be determined as described above with respect to FIG. 1B. Additionally, the storage blocks included in the list of recommended storage blocks may be referred to as "host storage blocks" with respect to the data to be retrieved. Although illustrated as discrete blocks, various blocks may be divided into additional blocks, combined into fewer blocks, or eliminated, depending on the desired implementation.

The method 500 may begin at block 502, where a current host storage block for retrieval of the data may be determined from the list of recommended storage blocks. In some embodiments, the list of recommended storage blocks may be ordered from the most preferred for retrieval of the data to the least preferred for retrieval of the data and the first current host storage block determined may be the most preferred host storage block in the list as indicated by its position in the list. In some embodiments, the preferability may be based on one or more of the factors described above such as location information of the data, assignment information of the data, the device types, peer-to-peer reachability, and/or presence information.

At block 504, it may be determined whether the current host storage block is "active" with respect to the storage network. In some embodiments, the current host storage block may be considered "active" when the current host storage block has some sort of connectivity with one or more elements of the storage network. For example, a storage block that has connectivity with respect to a storage network manager of the storage network may be considered "active" with respect to the storage network. In some embodiments, the storage agent may determine whether or not the current host storage block is "active" with a respect to the storage network based on, or as indicated by, presence information that may be received by the storage agent from the storage network manager.

When the current host storage block is not determined to be "active" with respect to the storage network (e.g., the current host storage block is "missing"), the method 500 may proceed to block 516. When the current host storage block is determined to be "active" with respect to the storage network, the method 500 may proceed to block 505.

At block 505, it may be determined whether or not the attempt to retrieve the data was unsuccessful due to data transfer capability of the current host storage block being disabled. For example, in some embodiments, the current host storage block may be included with a device whose connectivity is based on a cellular network and a user of the device may disable the functionality of data transfers over the cellular network. Therefore, although the current host storage block may be peer-to-peer reachable, the retrieval of the data from the current host storage block may be unsuccessful.

In some embodiments, the target storage agent may receive an error notification from the host device indicating that the peer-to-peer connection between the target device and the host device has been lost. Further, additional attempts to open new peer-to-peer connections may also result in receiving an error notification. Accordingly, it may be determined that data transfer capability of the current host storage block has been disabled based on the error notifications.

When the data transfer capability is disabled, the method 500 may proceed to block 516. When the data transfer capability is not disabled, the method 500 may proceed to block 506.

At block 506, it may be determined whether or not a peer-to-peer connection may be established between the device associated with the target storage block and the device associated with the current host storage block. Therefore, at block 506 the peer-to-peer reachability of the storage block associated with the storage agent and the current host storage block may be determined. In some embodiments, as described above, the peer-to-peer reachability may be determined based on the NATs associated with network connections that may be used by the devices associated with the target storage block and the current host storage block.

When the current host storage block is not peer-to-peer reachable with respect to the target storage block, the method 500 may proceed to block 516. When the current host storage block is peer-to-peer reachable with respect to the target storage block, the method 500 may proceed to block 508.

At block 508, an attempt may be made to retrieve the data from the current host storage block. In some embodiments, a peer-to-peer connection may be made or attempted to be made at block 508 in conjunction with the attempt to retrieve the data from the current host storage block.

At block 510, it may be determined whether or not the attempt to retrieve the data from the current host storage block is successful. When the attempt is successful, the method 500 may proceed to block 511. When the attempt is not successful, the method 500 may proceed to block 514.

At block 511, the peer-to-peer connection of the target storage block with the current host storage block may be terminated. In some embodiments, the peer-to-peer connection termination between the storage blocks may be accomplished by terminating the peer-to-peer connection between the device associated with the current host storage block and the device associated with the current host storage block. In these or other embodiments, the peer-to-peer connection may be maintained for a certain period of time after the data has been transferred such that another transfer of data between the current host storage block and the target storage block may be facilitated if another transfer is desired. In these or other embodiments, the connection may be terminated after it has been idle for a certain amount of time.

At block 514, retrieval of the data from the current host storage block may be reattempted. At block 515, it may be determined whether or not the re-attempt was successful. When the re-attempt is successful, the method 500 may proceed to block 511. When the re-attempt is not successful, the method 500 may proceed to block 517.

At block 517 it may be determined whether "N" number of attempted retrievals from the current host storage block have been performed. When "N" number of attempted retrievals from the current host storage block have been performed, the method 500 may proceed to block 516. When N" number of attempted retrievals from the current host storage block have not been performed, the method 500 may return to block 514.

At block 516, due to an inability to retrieve the data from the current host storage block, the next host storage block in the list of recommended storage blocks may be determined. At block 518, the next host storage block may be set as the current host storage block. The method 500 may return to block 504 following block 518 with the next host storage block now acting as the current host storage block.

Accordingly, the method 500 may be performed to retrieve data from a storage block of a storage network. One skilled in the art will appreciate that, for the method 500 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 500 may include one or more steps associated with determining whether the battery of the host device associated with the current host storage block is low and discharging. In some of these embodiments, an attempt to retrieve the data from the current host storage block may not be made when the battery of the host device associated with the current host storage block is low and discharging.

Further, in some embodiments, the method 500 may be performed in various iterations after different filtering and/or ordering mechanisms have been performed on the recommended list of storage blocks. As such, the order of the steps described above may not necessarily be performed in the exact sequential basis as described above nor may they be performed For example, in some embodiments, one or more steps of the method 500 may be performed as described below.

The target storage agent may determine which storage blocks in the list of recommended storage blocks are inactive with respect to the storage network and may remove the inactive host storage blocks from the list of recommended storage blocks such that the list of recommended storage blocks used by the target storage agent may have the inactive host storage blocks already removed. As such, the operations performed at block 504 may not be performed exactly as described above.

Further, in these or other embodiments, the target storage agent may determine which host storage blocks from the list of recommended storage blocks are connected to the same network as the target storage block. These host storage blocks may be referred to as "first-tier host storage blocks."

Because the first-tier host storage blocks and the target storage block may be connected to the same network, they may be known to be peer-to-peer reachable via a direct peer-to-peer connection. As such, the first-tier host storage blocks may be prioritized for data retrieval over other host storage blocks. In some embodiments, the list of recommended storage blocks may include the first-tier host storage blocks at the top of the list. In these or other embodiments, the method 500 may be performed with respect to a separate first-tier list that may include only the first-tier host storage blocks and if data retrieval from the first-tier list is not obtained, another list may be generated from the list of recommended storage blocks.

Figure 6:
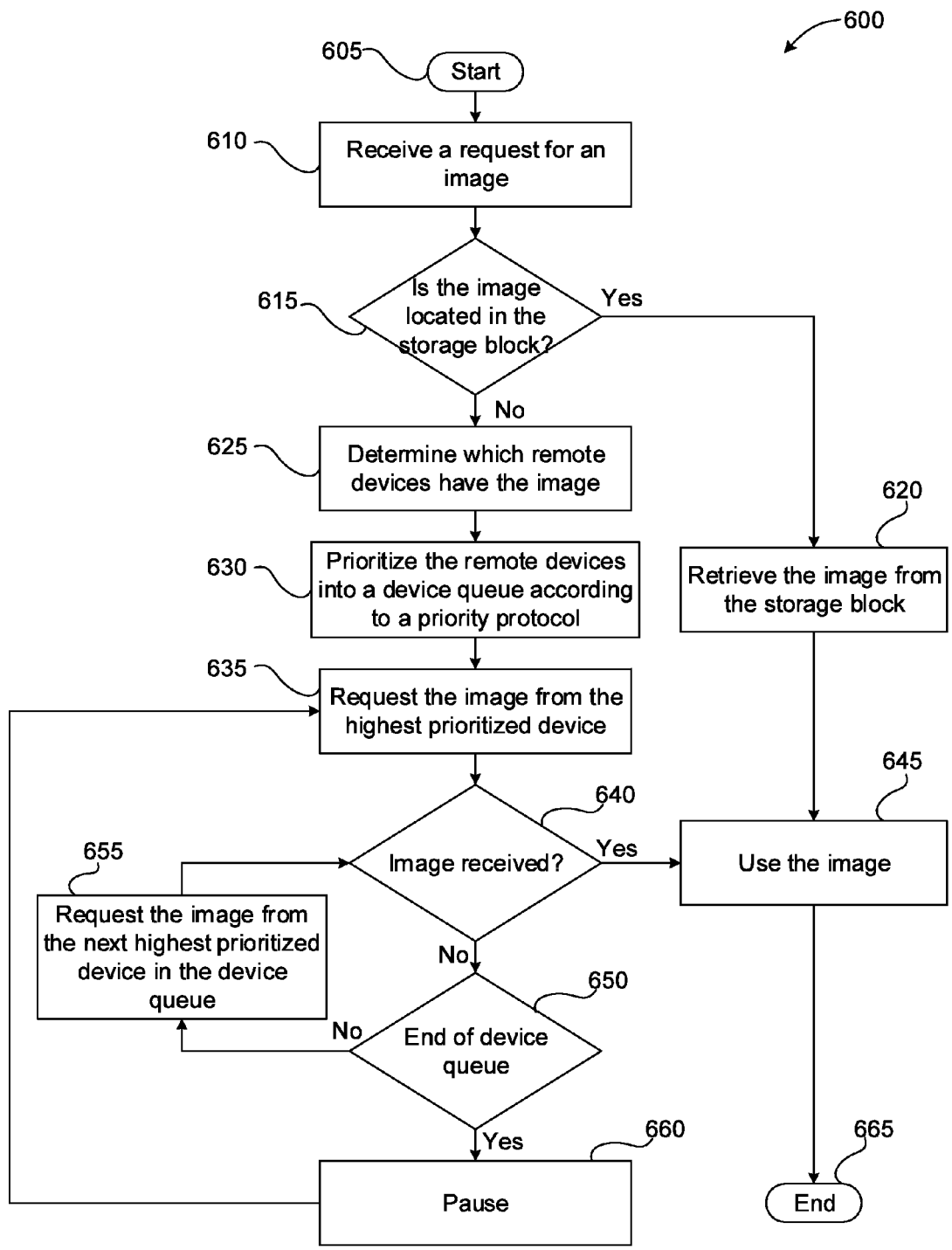
FIG. 6 is a flowchart of an example process for optimizing image requests from an device according to some embodiments described herein.

FIG. 6 is a flowchart of an example process 600 for optimizing image requests from the device 106*a* according to some embodiments described herein. One or more steps of the process 600 may be implemented, in some embodiments, by one or more components of the storage systems 100*a* and/or 100*b* of FIGS. 1A and 1B, such as the storage agents 104*a* and/or the processor 150*a*. Although illustrated as discrete blocks, various blocks may be divided into additional blocks, combined into fewer blocks, or eliminated, depending on the desired implementation.

The process 600 starts at block 605. At block 610 a request for an image may be received at or within the device 106*a*. The request for the image may be received from any source whether internally or externally from the device 106*a*. In some embodiments, the request may be received from a user through a user interface of the device 106*a* such as, for example, through a touch screen, a pointer device, a keyboard, etc. For example, a number of thumbnail images may be displayed to a user through the user interface of the device 106*a*. These thumbnail images may be related to a number of images stored, in the storage block 110*b* of the device 106*b*, in the storage block 110*c* of the device 106*c* and/or in any other storage block. In response, the user may select a thumbnail image in order to view the image related to the thumbnail image. In response, a request for the image may be received at block 610.

The request for the image may be initiated from the user through the user interface, from an application executing on the device 106*a*, from an application executing on the storage agent 104*a*, from an application executing on the processor 150*a*, from another device in the storage systems 100*a* and/or 100*b*, or from any other source.

In some embodiments, the request for an image may be initiated based on a listing of images (or objects) that the device 106*a* should fetch from the other devices 106*b*-106*f*. Each image of the listing of images may include a list of one of more of the other devices 106*b*-106*f* where the image is stored.

In some embodiments, the request for the image may be initiated to ensure image storage redundancy and/or storage balance among the various devices.

At block 615 it may be determined whether the requested image is located in the storage block 110*a* at the device 106*a* where the request is received. For example, the device 106*a* may use a lookup table to determine whether the requested image is stored in the storage block 110*a* of the device 106*a*. As another example, a thumbnail may include a pointer to the storage location where the requested image is stored within the storage block 110*a* of the device 106*a* and the image may or may not be found at the linked location. As another example, a thumbnail may include a pointer to the storage location at another device where the requested image is stored indicating that the image is not stored at the device 106*a*.

If it is determined at block 615 that the image is stored in the storage block 110*a* of the device 106*a*, then the process 600 may proceed to block 620 where the image is retrieved from the storage block 110*a*. At block 645 the image may be sent to the process, method, application, or user requesting the image for use. The process 600 may then end at block 665.

If it is determined at block 615 that the image is not stored in the storage block 110*a* of the device 106*a*, then the process 600 may proceed to block 625 where it is determined which of the remote devices 106*b*-106*f* have the requested image in storage.

In some embodiments each device 106 within the storage systems 100*a* and/or 100*b* may send image storage information specifying the images stored within each respective device 106. This image storage information, for example, may be broadcast and/or sent to every other device within the storage systems 100*a* and/or 100*b*. As another example, the image storage information may be sent to a storage network manager such as, for example, the storage manager 114, which may collect and/or collate the image storage information from various other devices 106 and then may share the collated image storage information with the various devices 106. In this way, each device may, for example, have information specifying where images are stored within the storage systems 100*a* and/or 100*b*.

In some embodiments a lookup table stored within the storage block 110*a* may be referenced to determine which devices include the requested image. Often the requested image may be stored in more than one of the devices 106*b*-106*f* of the storage systems 100*a* and/or 100*b*. At block 630 each of the devices that include a copy of the requested image may be prioritized in a device queue according to a prioritization protocol. The prioritization protocol may organize the devices based on any number of factors such as, for example, the electronic device type, the mobility of the electronic device, the power functionality of the electronic device, the IP address of the electronic device, the power state of the electronic device, the NAT type of the electronic device, the battery level of the electronic device, and/or the communication network of the electronic device. The prioritization protocol may use a variety of other factors.

In some embodiments, the prioritization protocol may prioritize devices having a copy of the requested image based on device type. For example, the prioritization protocol may prioritize a network manager such as, for example, the storage manager 114, over other devices having a copy of the requested image. As another example, the prioritization protocol may prioritize a desktop device having a copy of the requested image over other devices having a copy of the requested image except a network manager. As another example, the prioritization protocol may prioritize a laptop device having a copy of the requested image over other devices having a copy of the requested image except a desktop device having a copy of the requested image and/or a network manager having a copy of the requested image. As another example, the prioritization protocol may prioritize mobile devices having a copy of the requested image that are connected to an external power source over mobile devices having a copy of the requested image that are not connected to an external power source.

In some embodiments, the prioritization protocol may prioritize devices having a copy of the requested image based on the power state of the devices. For example, the prioritization protocol may prioritize devices having a copy of the requested image that are not battery operated over devices having a copy of the requested image that are battery operated. As another example, the prioritization protocol may prioritize devices having a copy of the requested image and a power state indicating the device is plugged into over those devices having a copy of the requested image and a power state indicating the device is powered by a battery. As another example, the prioritization protocol may prioritize devices having a copy of the requested image and a higher battery level over devices having a copy of the requested image and a lower battery level. As another example, the prioritization protocol may prioritize mobile devices having a copy of the requested image that are connected to an external power source over mobile devices having a copy of the requested image that are not connected to an external power source.

As another example, the prioritization protocol may prioritize devices having a copy of the requested image that are not mobile devices over devices having a copy of the requested image that are mobile devices.

In some embodiments the prioritization protocol may prioritize devices having a copy of the requested image based on network connection. For example, the prioritization protocol may prioritize devices having a copy of the requested image and a wired network connection over devices having a copy of the requested image and a wireless network connection. As another example, the prioritization protocol may prioritize devices having a copy of the requested image and a Wi-Fi network connection over those and a mobile network connection such as, for example, a 4G connection, a 3G connection, an LTE connection, a cellular connection, telephone network connection, etc. As another example, the prioritization protocol may prioritize devices having a copy of the requested image and having a higher bandwidth connection over those devices having a copy of the requested image and having a lower bandwidth connection.

In some embodiments, the prioritization protocol may prioritize devices having a copy of the requested image based on the NAT type of the devices. For example, the prioritization protocol may prioritize devices having a copy of the requested image with an open NAT type over devices having a copy of the requested image with a moderate NAT type and/or a strict NAT type. As another example, the prioritization protocol may prioritize devices having a copy of the requested image with a moderate NAT type over devices having a copy of the requested image with a strict NAT type.

In some embodiments, the prioritization protocol may prioritize devices having a copy of the requested image based on the IP address of the device. For example, the prioritization protocol may prioritize devices having a copy of the requested image with an IP address that is not behind a firewall over devices having a copy of the requested image with an IP address that is behind a firewall. As another example, the prioritization protocol may prioritize devices having a copy of the requested image with an IP address within a local area network over devices having a copy of the requested image that are not within the local area network.

Various other prioritization schemes and/or protocols may be implemented. In some embodiments, the prioritization protocol may prioritize devices having a copy of the requested image based on any combination of prioritization schemes described herein.

The prioritization protocol may prioritize the devices having the requested image into a device queue. The device queue may be a virtual device queue or a device queue that is stored in storage block 110 and/or updated from time to time based on data received from the various devices. In some embodiments, a prioritized device queue may be stored at the storage manager 114 that prioritizes all the devices within the storage systems 100*a* and/or 100*b* and/or the devices having a copy of the requested image within the storage systems 100*a* and/or 100*b*.

In some embodiments, each device within the storage systems 100*a* and/or 100*b* may periodically send device presence information to the storage manager 114. This device presence information may include prioritization information such as, for example, power state information, NAT type information, IP address, battery level information, and/or network information. This device presence information may be used to revise the prioritized device queue stored at the storage manager 114. In some embodiments, the prioritized device queue may be shared with other devices within the storage systems 100*a* and/or 100*b*.

At block 635, a copy of the image may be requested from the highest prioritized device within the device queue. For example, if the device queue comprises the storage manager 114, an iPhone, a tablet that is plugged into a power source, and a laptop computer that is connected behind a company firewall, the device queue may be prioritized in the following order: the storage manager 114, the tablet, the iPhone, and the laptop. Then, in block 635 a copy of the image may be requested from the highest prioritized device, which, in this example, is the storage manager 114. Various types of messages may be used to request a copy of the image such as, for example, a pull request, a fetch request, a GET request, etc.

At block 640 it can be determined whether a copy of the image was received at the device 106*a*. If a copy of the image was received, then the process 600 proceeds to block 645 and the copy of the image may be used as intended by the device 106*a*. If a copy of the image was not received, then the process 600 proceeds to block 650 where it can be determined if the end of the device queue has been reached. This can be determined, for example, by determining whether a request for a copy of the image has been sent to each device having a copy of the image. If the end of the device queue has not been reached at block 650, then the process 600 proceeds to block 655 where a request for a copy of the image is sent to the next highest prioritized device within the device queues. If the end of the device queue has been reached at block 650, then the process 600 proceeds to block 660 where the process 600 is paused for any period of time such as, for example, 1 ms, 2 ms, 5 ms, 10 ms, 50 ms, 100 ms, etc. After the pause, the process 600 returns to block 635.

Blocks 635, 640, 650, 655, and 660 may be repeated any number of times as a group, a sub group or individually indefinitely, until a timeout condition has been met, and/or when a copy of the image has been received.

Figure 7:
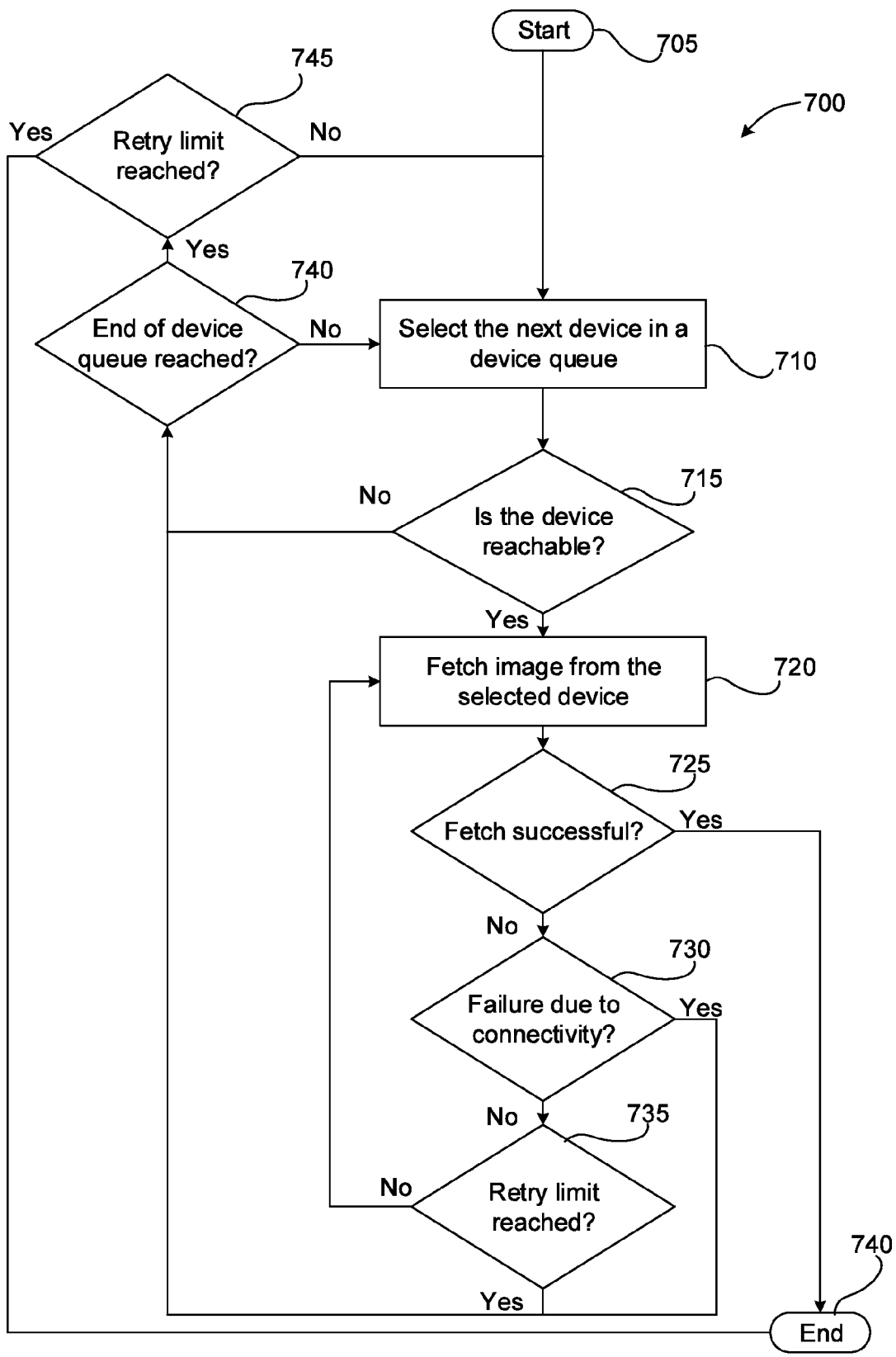
FIG. 7 is a flowchart of an example process for fetching an image from one or more devices from a device queue according to some embodiments described herein.

FIG. 7 is a flowchart of an example process 700 for fetching an image from one or more devices from a device queue according to some embodiments described herein. One or more steps of the process 700 may be implemented, in some embodiments, by one or more components of the storage systems 100*a* and/or 100*b* of FIGS. 1A and 1B, such as the storage agent 104*a* and/or the processor 150*a*. Although illustrated as discrete blocks, various blocks may be divided into additional blocks, combined into fewer blocks, or eliminated, depending on the desired implementation.

The process 700 starts at block 705. At block 710 the next device in a device queue listing the devices in the storage systems 100*a* and/or 100*b* that has a copy of an image may be selected from the device queue. The device queue may include a listing of a plurality of devices within the storage systems 100*a* and/or 100*b* that include a copy of a given image stored at the device. The devices having listed within the device queue, for example, have a copy of the image and/or may be prioritized based on a prioritization protocol as mentioned above. At first, the next device in the device queue is the first device in the device queue and/or the device with the highest priority within the device queue.

At block 715 it can be decided whether the selected device selected from the device queue has reachable. The selected device may be reachable if it is connected to a network that is reachable from the device executing the process 700. For example, if the selected device is behind a firewall then it is not reachable. As another example, if the device is not connected to the network or is not powered on or if it's in a sleep or hibernate state, it may not be reachable.

If the selected device is not reachable, then the process 700 may proceed to block 740 where it can be determined whether the selected device is listed at the end of the device queue. If the selected device is not the last device in the device queue, then the process 700 may return to block 710 where the next device in the device queue is selected. If the selected device is the last device in the device queue, then the process 700 may proceed to block 745 where it can be determined whether the number of times the process has selected each of the devices in the device queue equals the device retry limit. The device retry limit may be 1, 2, 3, 4, 5, 6, 7, 8, 9, or 10. If the device retry limit has not been reached then the process 700 moves to block 710 and the next device within the device list is selected, which, in this case, should be the first device in the device list.

If the device retry limit has been reached then the process 700 ends at block 740.

Returning to block 715, if the selected device is reachable, then the process 700 proceeds to block 720 where a copy of the image is fetched from the selected device through the network. The copy of the image may be fetched in any number of ways. For example, a fetch request may be sent to the selected device that indicates the name of the image being requested and/or other information about the requested image and/or the device 106*a*. As part of the fetch request, for example, the device 106*a*, which is executing the process 700, may open a network connection with the selected device through the network. The image may be transferred through the open network connection established between the two devices. Any type of communication or file transfer protocol may be used.

At block 725 it can be determined whether the fetch was successful based on whether a copy of the image received at the device 106*a* executing the process 700. If the fetch was successful, then the process 700 may end at block 740. If the fetch was not successful, the process 700 may proceed to block 730 where it can be determined whether the failure was due to connectivity with the selected device. A network connectivity failure may be determined based on whether the network connection between the selected device and the device executing the process 700 has been closed. A network connectivity failure may be determined, for example, based on the network status of the device executing the process 700. A network connectivity failure may be determined, for example, based on updated presence information provided by the selected device or based on information regarding the connectivity of the selected device from the storage manager 114.

If the failure was due to network connectivity, then the process 700 may proceed to block 740. If the failure was not due to network connectivity, then the process 700 may proceed to block 735 where it can be determined whether the number of times a fetch request for the copy of the image was sent to the selected device is less than a fetch retry limit. The fetch retry limit may be, for example, 1, 2, 3, 4, 5, 6, 7, 8, 9, or 10 fetch retry attempts. If the fetch retry limit has not been reached, then the process 700 may proceed to block 720. If the fetch retry limit has been reached, then the process 700 may proceed to 740.

Figure 8:
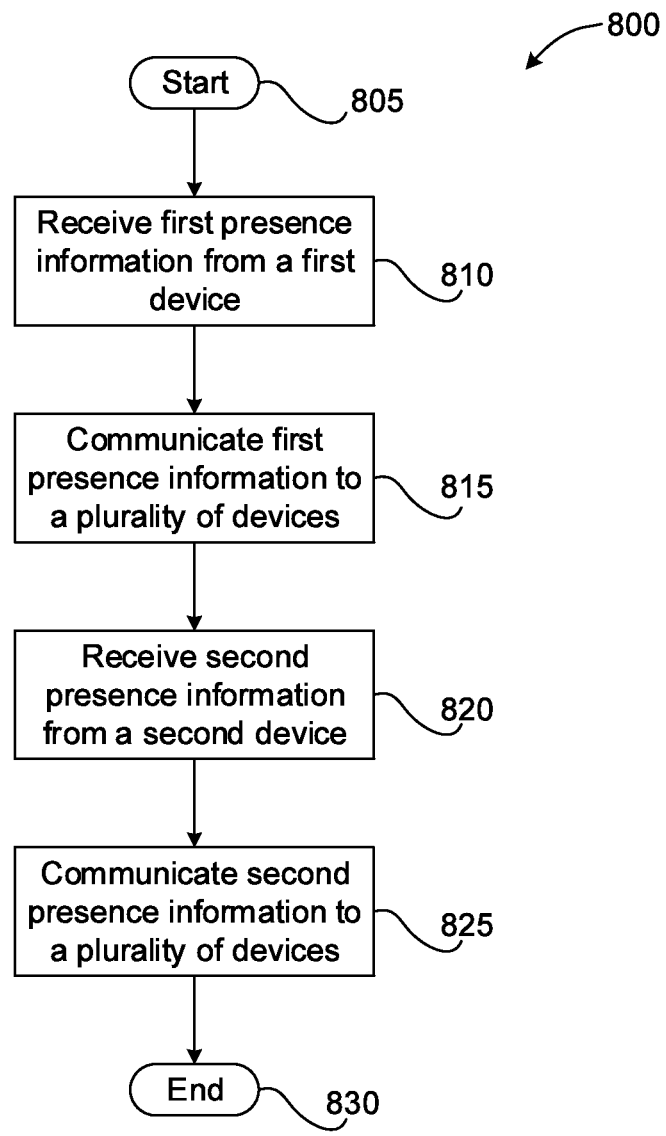
FIG. 8 is a flowchart of an example process for communicating presence information among a plurality of devices using a central device according to some embodiments described herein.

FIG. 8 is a flowchart of an example process 800 for communicating presence information among a plurality of devices using a central device according to some embodiments described herein. One or more steps of the process 800 may be implemented, in some embodiments, by one or more components of the storage systems 100*a* and/or 100*b* of FIGS. 1A and 1B. The central device may be the storage manager 114, the storage agents 104, or the devices 106. Although illustrated as discrete blocks, various blocks may be divided into additional blocks, combined into fewer blocks, or eliminated, depending on the desired implementation.

The process 800 starts at block 805. At block 810 the central device may receive first presence information from the first device 106*a* via the network. The first presence information may include, for example, power state information, NAT type information, IP address, battery level information, and/or network information of the first device 106*a*. The first presence information may be used to update a file, document, lookup table, and/or database that include the presence information (and/or other information) for all the devices within the storage systems 100*a* and/or 100*b*.

At block 815 presence information for all devices may be broadcast to one, some, or all the devices within the storage systems 100*a* and/or 100*b*. Alternatively and/or additionally, only the updated presence information may be communicated with one, some, or all the devices and/or the first presence information may be sent to one, some, or all the devices. In some embodiments, the presence information may be broadcast to one, some, or all the devices in response to receiving the first presence information or at predetermined periods of time.

At block 820 the central device may receive second presence information from the second device 106*b* via the network. The second presence information may include, for example, power state information, NAT type information, IP address, battery level information, and/or network information of the second device 106*b*. The second presence information may be used to update a file, document, lookup table, and/or database that include the presence information (and/or other information) for all the devices within the storage systems 100*a* and/or 100*b*.

At block 825 presence information for all devices may be broadcast to one, some, or all the devices within the storage systems 100*a* and/or 100*b*. Alternatively and/or additionally, only the updated presence information may be communicated with one, some, or all the devices and/or the second presence information may be sent to one, some, or all the devices. In some embodiments, the presence information may be broadcast to one, some, or all the devices in response to receiving the second presence information or at predetermined periods of time.

Additional presence information may be received from one or more additional devices and this additional presence information may be broadcast to the various devices in the storage systems 100*a* and/or 100*b*. The process 800 may be repeated any number of times for any number of different devices. The process 800 may end at block 830.

The process 800 may be used for, example, by the storage manager 114. The device 106*a* may periodically send presence information to the storage manager 114. And the presence information may be received at the storage manager 114 at block 810. The device 106*b* may periodically send presence information to the storage manager 114. And the presence information may be received at the storage manager 114 at block 820. In some embodiments, the storage manager 114 may collect, collate, and/or update the presence information and send the presence information to the devices 106*a*, 106*b*, 106*c*, 106*d*, etc. In some embodiments, the storage manager 114 may forward the presence information to the devices 106*a*, 106*b*, 106*c*, 106*d*, etc. with little or no manipulation of the presence information.

In some embodiments, the presence information sent by the device 106*a* may include the NAT type of the device 106*a*. The NAT type may be used to by another agent to determine peer-to-peer reachability.

The processes 600 and 700 describe fetching images from another device through the network. While images are described in these specific examples, these processes may be used for any type of data such as, for example, digital video, digital music, documents, spreadsheets, software, etc.

In these or other embodiments, host storage blocks included in the recommended list of storage blocks that may have a Wi-Fi or Ethernet connection to the storage network and that may be peer-to-peer reachable with the target storage block via a direct peer-to-peer connection, but that may not be part of the same network of the target storage block may be determined. These host storage blocks may be referred to as "second-tier host storage blocks." In some embodiments, the second-tier host storage blocks may be ordered after the first-tier host storage blocks in the list of recommended storage blocks. In these or other embodiments, one or more steps of the method 500 may be performed with respect to a separate second-tier list that may include only the second-tier host storage blocks after being performed with respect to the first-tier list. If data retrieval from the second-tier list is not obtained, another list may be generated from the list of recommended storage blocks.

In these or other embodiments, host storage blocks included in the recommended list of storage blocks that may have a cellular connection to the storage network and that may be peer-to-peer reachable with the target storage block via a direct peer-to-peer connection, but that may not be part of the same network of the target storage block may be determined. These host storage blocks may be referred to as "third-tier host storage blocks." In some embodiments, the third-tier host storage blocks may be ordered after the second-tier host storage blocks in the list of recommended storage blocks. In these or other embodiments, one or more steps of the method 500 may be performed with respect to a separate third-tier list that may include only the third-tier host storage blocks after being performed with respect to the second-tier list. If data retrieval from the third-tier list is not obtained, another list may be generated from the list of recommended storage blocks.

In these or other embodiments, host storage blocks included in the recommended list of storage blocks that may have a Wi-Fi or Ethernet connection to the storage network and that may be peer-to-peer reachable with the target storage block via a relay peer-to-peer connection may be determined. These host storage blocks may be referred to as "fourth-tier host storage blocks." In some embodiments, the fourth-tier host storage blocks may be ordered after the third-tier host storage blocks in the list of recommended storage blocks. In these or other embodiments, one or more steps of the method 500 may be performed with respect to a separate fourth-tier list that may include only the fourth-tier host storage blocks after being performed with respect to the third-tier list. If data retrieval from the fourth-tier list is not obtained, another list may be generated from the list of recommended storage blocks.

In these or other embodiments, host storage blocks included in the recommended list of storage blocks that may have a cellular connection to the storage network and that may be peer-to-peer reachable with the target storage block via a relay peer-to-peer connection may be determined. These host storage blocks may be referred to as "fifth-tier host storage blocks." In some embodiments, the fifth-tier host storage blocks may be ordered after the fourth-tier host storage blocks in the list of recommended storage blocks. In these or other embodiments, the method 500 may be performed with respect to a separate fifth-tier list that may include only the fifth-tier host storage blocks after being performed with respect to the fourth-tier list.

The above description of how the first-, second-, third-, fourth-, and fifth-tier host storage blocks and lists are obtained is merely an example and not limiting. Additionally or alternatively, the list of recommended storage blocks may be ordered and/or separated using many other different factors such as location information of the data, physical location information, assignment information of the data, the device types, and/or presence information.

As described above, the embodiments described herein may include the use of a special-purpose or general-purpose computer (e.g., the processors 150 of FIG. 1) including various computer hardware or software modules, as discussed in greater detail below. The special-purpose or general-purpose computer may be configured to execute computer-executable instructions stored on computer-readable media (e.g., the memories 152 and/or the storage blocks 110 of FIG. 1).

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the present disclosure.

What is claimed is:

1. Non-transitory computer-readable storage media including instructions that cause a system to perform operations to retrieve data in a storage network, the operations comprising:

determining a list of storage blocks of a storage network for potential retrieval of a data file for storage of the data file on a first storage block of the storage network, the determining being based on two or more of the following: assignment information of the data file as assigned by a storage network manager of the storage network; location information of the data file that indicates which storage blocks of the storage network include the data file stored thereon; physical location information that indicates physical locations of the storage blocks; device types of devices that include storage blocks with the data file stored thereon; peer-to-peer reachability of the first storage block with respect to other storage blocks of the storage network; network information indicating which storage blocks are connected to the same local network; and presence information indicating the presence, with respect to the storage network, of the storage blocks including the data file stored thereon;

attempting to retrieve the data file from a second storage block included in the list of storage blocks for storage of the data file on the first storage block based on:
the second storage block being included in the list;
a determination that the second storage block is active with respect to the storage network, the determination that the second storage block is active being based on: presence information of the second storage block that includes an activity level of the second storage block with respect to the storage network; an Internet protocol (IP) address used by a devices that includes the second storage block; a connectivity type of a connection, with respect to the storage network, of the device that includes the second storage block; available data rates of the connection, with respect to the storage network, of the device that includes the second storage block; bandwidth of the connection, with respect to the storage network, of the device that includes the second storage block; a power state of the device that includes the second storage block, wherein the power state indicates whether the device that includes the second storage block is charging or discharging its battery; a battery level of the device that includes the second storage block; and Network Address Translation (NAT) associated with the device that includes the second storage block;
a determination that data transfer capability of the device that includes the second storage block is enabled; and
a determination that the second storage block is peer-to-peer reachable with respect to the first storage block; and attempting to retrieve the data file from a third storage block included in the list of storage blocks for storage on the first storage block in response to retrieval from the second storage block failing and based on the third storage block being included in the list of storage blocks.

2. The non-transitory computer-readable storage media of claim 1, wherein the operations further comprise:
ordering the list of storage blocks based on a priority of from which storage block to retrieve the data file, the ordering being based on one or more of the device type, peer-to-peer reachability, and the assignment information; and
attempting to retrieve the data file from the second storage block before the third storage block based on the second storage block being prioritized over the third storage block for retrieval of the data file.

3. The non-transitory computer-readable storage media of claim 1, wherein the operations further comprise attempting to retrieve the data file from the second storage block a designated number of times before attempting to retrieve the data file from the third storage block.

4. The non-transitory computer-readable storage media of claim 1, wherein the operations further comprise limiting a total number of active connections of the first storage block with other storage blocks at any one time.

5. The non-transitory computer-readable storage media of claim 1, wherein the operations further comprise limiting a total number of active connections of the first storage block with the second storage block at any one time.

6. The non-transitory computer-readable storage media of claim 1, wherein the assignment information includes an allocation of the data file to one or more storage blocks of the storage network, the allocation being determined based on a plurality of characteristics associated with the one or more storage blocks, the plurality of characteristics including a likelihood of loss of the one or more storage blocks, frequency of availability of the one or more storage blocks with respect to the storage network, and use of the one or more storage blocks with respect to other data having a same data type as the data file.

7. A device comprising:
a processor; and
memory communicatively coupled to the processor, the memory including instructions that cause the processor to perform operations to retrieve data in a storage network, the operations comprising:
determining a list of storage blocks of a storage network for potential retrieval of a data file for storage of the data file on a first storage block of the storage network, the determining being based on: physical location information that indicates physical locations of the storage blocks; device types of devices that include storage blocks with the data file stored thereon; peer-to-peer reachability of the first storage block with respect to other storage blocks of the storage network; network information indicating which storage blocks are connected to the same local network; and presence information indicating the presence, with respect to the storage network, of the storage blocks including the data file stored thereon;
attempting to retrieve the data file from a second storage block included in the list of storage blocks for storage of the data file on the first storage block based on:
the second storage block being included in the list; and
a determination that the second storage block is active with respect to the storage network, the determination that the second storage block is active being based on: presence information of the second storage block that includes: an activity level of the second storage block with respect to the storage network; an Internet protocol (IP) address used by a devices that includes the second storage block; a connectivity type of a connection, with respect to the storage network, of the device that includes the second storage block; available data rates of the connection, with respect to the storage network, of the device that includes the second storage block; bandwidth of the connection, with respect to the storage network, of the device that includes the second storage block; a power state of the device that includes the second storage block, wherein the power state indicates whether the device that includes the second storage block is charging or discharging its battery; battery level of the device that includes the second storage block; and Network Address Translation (NAT) associated with the device that includes the second storage block; and
attempting to retrieve the data file from a third storage block included in the list of storage blocks for storage on the first storage block in response to retrieval from the second storage block failing and based on the third storage block being included in the list of storage blocks.

8. The device of claim 7, wherein the assignment information includes an allocation of the data file to one or more storage blocks of the storage network, the allocation being determined based on a plurality of characteristics associated with the one or more storage blocks, the plurality of characteristics including a likelihood of loss of the one or more storage blocks, frequency of availability of the one or more storage blocks with respect to the storage network, and use of the one or more storage blocks with respect to other data having a same data type as the data file.

* * * * *